US012274658B1

(12) United States Patent
Huang et al.

(10) Patent No.: US 12,274,658 B1
(45) Date of Patent: Apr. 15, 2025

(54) FOOT MASSAGE ARRANGEMENT

(71) Applicant: FUJIAN YITAIKANG ELECTRONICS CO., LTD, Fuzhou (CN)

(72) Inventors: Bin Long Huang, Fuzhou (CN); Sheng Ye, Fuzhou (CN)

(73) Assignee: FUJIAN YITAIKANG ELECTRONICS CO., LTD, Fuzhou (CN)

(*) Notice: Subject to any disclaimer, the term of this patent is extended or adjusted under 35 U.S.C. 154(b) by 0 days.

(21) Appl. No.: 18/822,256

(22) Filed: Sep. 1, 2024

(30) Foreign Application Priority Data

Apr. 17, 2024 (CN) ......................... 202420799946.8

(51) Int. Cl.
*A61H 15/00* (2006.01)

(52) U.S. Cl.
CPC ... *A61H 15/0078* (2013.01); *A61H 2015/005* (2013.01); *A61H 2201/1215* (2013.01); *A61H 2201/1669* (2013.01); *A61H 2205/12* (2013.01)

(58) Field of Classification Search
CPC .......... A61H 15/0078; A61H 2015/005; A61H 2201/121; A61H 2201/1669; A61H 2205/12
See application file for complete search history.

(56) References Cited

U.S. PATENT DOCUMENTS

| | | | | |
|---|---|---|---|---|
| 2011/0196274 | A1* | 8/2011 | Ding | A61H 7/007 601/136 |
| 2019/0133875 | A1* | 5/2019 | Choi | A61H 7/004 |
| 2019/0321259 | A1* | 10/2019 | Zhou | A61H 7/007 |
| 2021/0307995 | A1* | 10/2021 | Zhou | A61H 7/007 |
| 2022/0000706 | A1* | 1/2022 | Grbic | A61H 23/0263 |
| 2022/0409476 | A1* | 12/2022 | Du | A61H 15/0078 |
| 2024/0122787 | A1* | 4/2024 | Li | A61H 7/00 |

* cited by examiner

*Primary Examiner* — Justine R Yu
*Assistant Examiner* — Matthew R Moon
(74) *Attorney, Agent, or Firm* — Ying-Ting Chen

(57) ABSTRACT

A foot massage arrangement include a shell body, a massage assembly and a control assembly, the massage assembly includes two sole massage heads, two heel massage heads, two first transmission units coupled to the two sole massage head respectively, and two second transmission units coupled to the two heel massage heads respectively, the control assembly includes a controller and a power source electrically connected to the controller for driving the two first transmission units and the two second transmission units, so as to respectively drive the two sole massage heads to rotate to massage two soles of the user and drive the two heel massage heads to linearly and reciprocate to massage two heels of the user.

16 Claims, 33 Drawing Sheets

FOOT MASSAGE ARRANGEMENT

CROSS REFERENCE

The present disclosure claims priority of China Patent Application No. CN202420799946.8, filed on Apr. 17, 2024, the entire contents of which are hereby incorporated by reference in their entirety.

TECHNICAL FIELD

The present disclosure relates to technical field of foot massaging, and more particularly to a foot massage arrangement which employs a plurality of massaging heads for simultaneously massaging multiple areas of the foot of the user.

BACKGROUND

The foot massage offers a range of benefits for a user. It can stimulate blood flow, which can help improve overall circulation in the body. Massaging the foot can promote relaxation and reduce stress levels, providing a calming effect on the mind and body. Regular foot massage can alleviate pain from conditions such as plantar fasciitis, arthritis, and general foot soreness. The relaxing effects of a foot massage can lead to improved sleep quality, helping individuals fall asleep faster and enjoy deeper rest. Foot massage also can release endorphins, which are natural mood lifters, leading to a better overall mood and reduced anxiety.

A conventional foot massager generally includes a rotation massaging unit for massaging the sole of the user, but the conventional foot massager is not designed to massage other areas of the foot of the user. By focusing solely on the sole, conventional foot massagers do not provide a comprehensive massage experience. Key areas like the toes and heel, which also require attention, are neglected, resulting in an incomplete therapeutic session. Users may experience uneven relief as the sole is massaged while other parts of the foot remain tense or untreated. This can lead to an imbalance in foot comfort and overall relaxation. The foot has numerous reflex points corresponding to different body organs and systems. A massager that only targets the sole misses crucial reflex points located in the toes and heel, thereby limiting the potential health benefits of the massage.

There is currently a conventional foot massager equipped with a wireless remote control for the user's convenience. This allows the user to adjust the settings and massage modes without frequently bending over to operate the foot massager. However, the wireless remote control is small and often difficult to locate due to its tendency to be placed anywhere. The tendency to place the remote randomly increases the likelihood of it getting lost. This can be particularly problematic for users with limited mobility. If the remote control is lost or damaged, users may not be able to use the foot massager at all, especially if there are no manual controls on the device itself.

In addition, during usage, the feet of the user are placed in foot receiving covers in the foot massage. However, a foot receiving cover that is not easily accessible or removable complicates the cleaning process, making it challenging to maintain hygiene standards. Feet naturally sweat, and the moist environment inside the foot receiving cover can become a breeding ground for bacteria and fungi, leading to potential infections or unpleasant odors. The foot receiving cover can accumulate dirt, dead skin cells, and other debris over time, making the massager unhygienic and uncomfortable to use. Cleaning a non-removable or intricate foot receiving cover can be time-consuming and labor-intensive, discouraging users from regular maintenance.

SUMMARY OF THE DISCLOSURE

An object of the present invention is to provide a foot massage arrangement which comprises a plurality of massaging heads for simultaneously massaging multiple areas of the foot of the user. Comprehensive coverage ensures that a relatively large part of the foot receive attention, leading to complete relaxation and stress relief. Multiple heads distribute pressure evenly across the foot, effectively releasing tension and reducing muscle fatigue.

Another object of the present invention is to provide a foot massage arrangement for massaging multiple areas simultaneously, so as to enhance overall blood circulation, promote better oxygenation and nutrient delivery to foot tissues. Improved circulation helps reduce swelling and inflammation, particularly beneficial for individuals with conditions like edema or varicose veins.

Another object of the present invention is to provide a foot massage arrangement for targeted relief, wherein different heads can be designed to target specific pressure points and muscle groups, providing targeted relief where it's most needed. Multiple massaging heads can stimulate various reflex points on the foot, which correspond to different organs and systems in the body, promoting overall health and well-being through reflexology. By addressing all areas of the foot, the arrangement can provide comprehensive pain relief from conditions such as plantar fasciitis, Achilles tendonitis, and general foot fatigue.

Another object of the present invention is to provide a foot massage arrangement which is able to massage the heel of the user, so as to help stimulate blood flow throughout the entire foot, promote better circulation and oxygenation to the tissues. Enhanced circulation can reduce swelling and fluid retention, particularly beneficial for individuals who stand or walk for long periods. Targeting the heel can help relieve pain associated with conditions like plantar fasciitis, heel spurs, and Achilles tendonitis. Regular heel massage can help reduce inflammation and discomfort in the heel area, providing relief from chronic pain. In addition, Massaging the heel can be particularly beneficial for individuals with plantar fasciitis, as it helps stretch and relax the plantar fascia, reducing pain and inflammation.

Another object of the present invention is to provide a foot massage arrangement which is able to massage the toes of the user, targeting the toes can help relieve pain associated with conditions like bunions, hammer toes, and general toe discomfort. Regular toe massage can help reduce inflammation and discomfort in the toe area, providing relief from chronic pain. Alleviating tension in the toes can help reduce overall foot and lower leg tension, contributing to a sense of relaxation and well-being.

Another object of the present invention is to provide a foot massage arrangement which is able to simultaneous massage all major parts of the foot including the heel, the sole, and the toes, so as to provide a balanced and thorough massage experience. Addressing the entire foot at the same time helps release tension evenly, reducing muscle fatigue and promoting overall relaxation, and alleviating pain more effectively by addressing all potential sources of discomfort within the foot. Simultaneous massage helps relax and stretch the muscles, tendons, and ligaments across the entire foot, enhancing flexibility and range of motion.

Another object of the present invention is to provide a foot massage arrangement which comprises a remote controller, wherein a designated slot or docking area on a main body of the foot massage arrangement for the remote controller reduces the likelihood of it getting lost, ensuring it is always available when needed. A dedicated spot on the main body of the foot massage arrangement for the remote controller ensures it is always within easy reach when needed, so that the user can quickly grab the remote to adjust settings without having to search for it, improving the overall user experience. Keeping the remote securely attached to the main body of the foot massage arrangement prevents the frustration of misplacing it, making the device easier and more pleasant to the user.

Another object of the present invention is to provide a foot massage arrangement which comprises detachable foot receiving pockets which can be easily removed and washed, ensuring that the foot massage arrangement remains clean and hygienic after each use. Regular cleaning prevents the buildup of odors caused by sweat and dirt, maintaining a fresh and pleasant user experience. In households where the foot massage arrangement is shared among family members, detachable pockets can be individually cleaned or even swapped out, ensuring each user has a hygienic experience.

The present invention provides a foot massage arrangement for massaging two feet of a user, comprising:

a shell body having a receiving cavity and two openings communicated to the receiving cavity to allow the two feet of the user to enter the receiving cavity;

a massage assembly which comprises two sole massage heads, two heel massage heads, two first transmission units coupled to the two sole massage head respectively, and two second transmission units coupled to the two heel massage heads respectively; and a control assembly which comprises a controller and a power source electrically connected to the controller for driving the two first transmission units and the two second transmission units, so as to respectively drive the two sole massage heads to massage two soles of the user and drive the two heel massage heads to massage two heels of the user.

Preferably, the power source comprises a motor, when the motor is in operation, each the first transmission unit and each the second transmission unit are driven by the motor, so as to simultaneously drive the corresponding sole massage head and the heel massage head respectively.

Preferably, each the sole massage head is driven to rotate by the corresponding first transmission unit, wherein each the heel massage head is driven to generate a linear reciprocating movement.

Preferably, the power source comprises an output shaft extended from the motor, wherein each the first transmission unit comprises a first gear element engaged with the output shaft, and a second gear element engaged with the first gear element, and a driving arm extended from the second gear element for driving the corresponding sole massage head.

Preferably, each the second transmission unit comprises an eccentric pin connected to the second gear element, and an extension arm coupled to the eccentric pin to drive the corresponding heel massage head.

Preferably, the output shaft comprises engaging screws, the first gear element comprise an upper teeth portion meshed with the engaging screws of the output shaft and a lower teeth portion meshed with the second gear element.

Preferably, the massage assembly further comprises two toe massage heads for massaging toes of the two feet of the user respectively and two third transmission units coupled to the two toe massage heads for being driven by the power source to drive the two toe massage heads respectively.

Preferably, the massage assembly further comprises two toe massage heads for massaging toes of the two feet of the user respectively and two third transmission units coupled to the two toe massage heads for being driven by the power source to drive rotation of the two toe massage heads respectively, wherein the motor drives movement of each the sole massage head, each the heel massage head and each the toe massage head simultaneously.

Preferably, the power source comprises an output shaft extended from the motor, wherein each the first transmission unit comprises a first gear element engaged with the output shaft, and a second gear element engaged with the first gear element, and a driving arm extended from the second gear element for driving the corresponding sole massage head, wherein each the third transmission unit comprises a third gear element which is engaged with the second gear element, wherein each the toe massage head comprises an upper toe massage portion and a lower mesh portion connected to the upper toe massage portion, wherein the lower mesh portion of each the toe massage head is engaged with the corresponding third gear element.

Preferably, each the second transmission unit comprises an eccentric pin connected to the second gear element, and an extension arm coupled to the eccentric pin to drive the corresponding heel massage head, wherein the output shaft comprises engaging screws, the first gear element comprise an upper teeth portion meshed with the engaging screws of the output shaft and a lower teeth portion meshed with the second gear element.

Preferably, the upper toe massage portion of each the toe massage head comprises a rotation base and two circles of toe massage protrusions distributed on the rotation base, wherein the two circles of toe massage protrusions have different spacing between two adjacent toe massage protrusions.

Preferably, the foot massage arrangement further comprises a heating assembly which comprises a plurality of heating elements provided under the corresponding sole massage head, wherein each the sole massage head comprises a rotating plate and a plurality of massage protrusions protruded from the rotating plate, wherein the rotating plate has a plurality of heat conduction holes aligned with the plurality of heating elements respectively.

Preferably, the foot massage arrangement further comprises an air cushioning cover provided above each the sole massage head, and a plurality of protrusion pins mounted in the shell body under the air cushioning cover, wherein the air cushioning cover is capable of being deflated, so as to press the toes of the user against the plurality of protrusion pins.

Preferably, the shell body comprises two guide ridges and a bottom floor to define a guide groove for guiding movement of each heel massage head, wherein the bottom floor is an inclined surface.

Preferably, the foot massage arrangement further comprises a pocket assembly which comprises two foot receiving pockets detachably coupled to the two openings respectively, wherein the two foot receiving pockets are capable of being disposed into the receiving cavity for receiving the two feet of the user, wherein the two foot receiving pockets are detachably mounted to the shell body.

Preferably, the pocket assembly comprises two fixing pockets which are fixed to the shell body and extended into the receiving cavity, wherein the two foot receiving pockets are respectively disposed into the two fixing pockets and detachably coupled to the two fixing pockets, wherein the foot massage arrangement further comprises an air cushioning cover which is covered on each corresponding fixing pocket which is embedded with the corresponding foot receiving pocket.

Preferably, the controller is detachably mounted to the shell body.

Preferably, the shell body comprises an upper shell which is a flexible shell, a lower shell which is a rigid shell, a flexible ring and a zipper ring, wherein the flexible upper shell, the flexible ring and the zipper ring are stitched together to form an integral flexible assembly that is mounted to the lower shell, wherein the zipper ring is capable of being shifted into an open state to allow the upper shell to be in an open state that allows installation and maintenance of the foot massage arrangement.

A massage mechanism for foot massage arrangement, comprising:

a motor;

two sole massage heads;

two first transmission units coupled to the two sole massage head respectively;

two heel massage heads;

two second transmission units coupled to the two heel massage heads respectively;

two toe massage heads; and two third transmission units coupled to the two toe massage heads respectively, wherein the two first transmission units, the two second transmission units and the two third transmission units are simultaneously driven by the motor to drive the two sole massage heads, the two heel massage heads, and the two toe massage heads respectively.

The present inventions provides a portable foot massage arrangement comprising a lower shell and an upper shell assembled with the lower shell, wherein the upper shell is provided with at least an opening for the foot to be inserted, the upper shell is also provided with a remote controller placement area, and the remote controller placement area is provided with a pre-tightening member for pre-tightening the remote controller.

Preferably, the pretightening member comprises a silicone body which is fixedly arranged inside the remote controller placement area, and a groove for the remote controller to be inserted is provided on the top of the silicone body, and the width of the groove is smaller than the thickness of the remote controller.

Preferably, the length of the silicone body is smaller than the length of the placement area, the outer wall of one end of the silicone body is in contact with the inner wall of the remote controller placement area, and there is a reserved area between the other end of the silicone body and the remote controller placement area, one end of the groove is communicated to the reserved area, and the length of the groove is smaller than the length of the remote controller.

Preferably, a through groove is horizontally penetrated through the silicone body.

Preferably, the upper shell is detachably provided with a cloth pocket bracket at the mouth position, and the rear end of the cloth pocket bracket is arranged in an arc-shaped groove shape.

Preferably, the upper shell is provided with a plurality of groups of insertion holes at the top edge of the mouth, and insertion rods are provided corresponding to insertion holes and are arranged on the peripheral side of the bottom end surface of the cloth pocket bracket, and the outer wall of each insertion rod is covered with a rubber layer.

The present invention provides a remote controller placement area for placing the remote controller on the upper shell, which is convenient for fixed storage of the remote controller, and is easy to use and not easy to lose.

A silicone body is arranged in the placement area to facilitate the fixed placement of the remote controller and prevent the vibration of the foot massage arrangement during use from causing abnormal noise in the remote controller placement area.

DETAILED DESCRIPTION

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without creative labor fall within the scope of the present disclosure.

Figure 1:
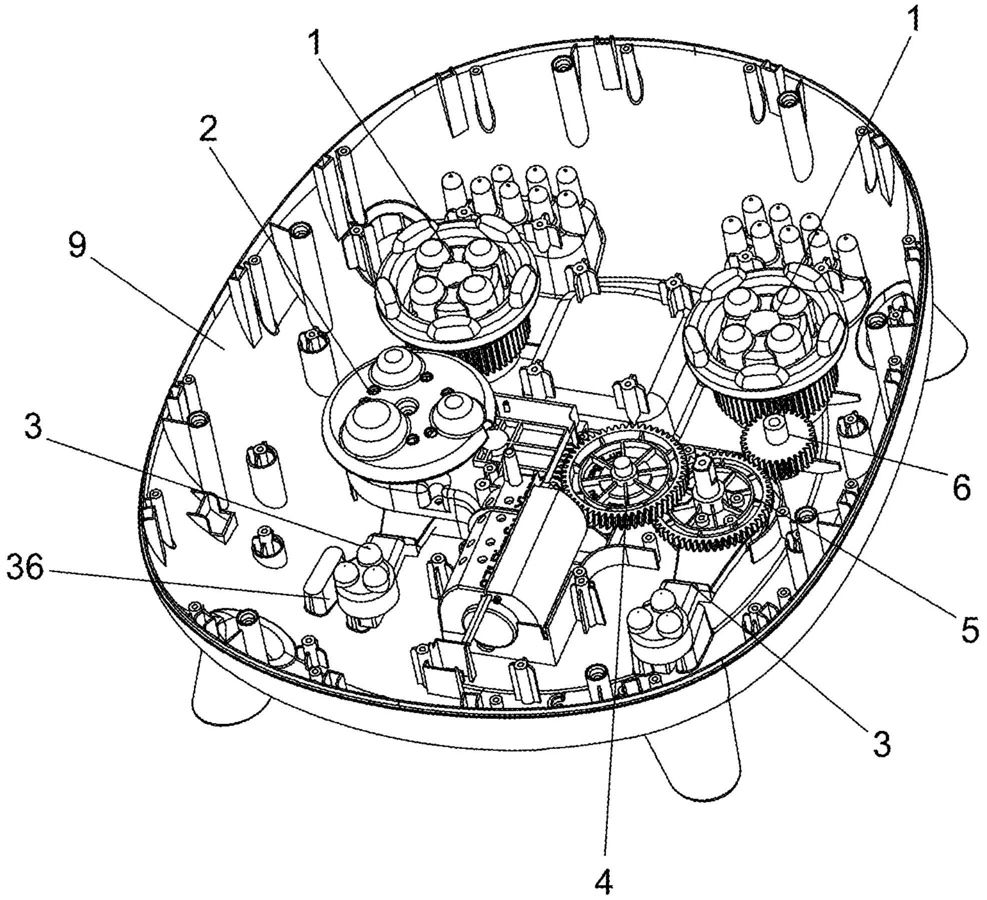
FIG. 1 is a perspective view of a foot massage arrangement according to a first embodiment of the present invention.
Figure 2:
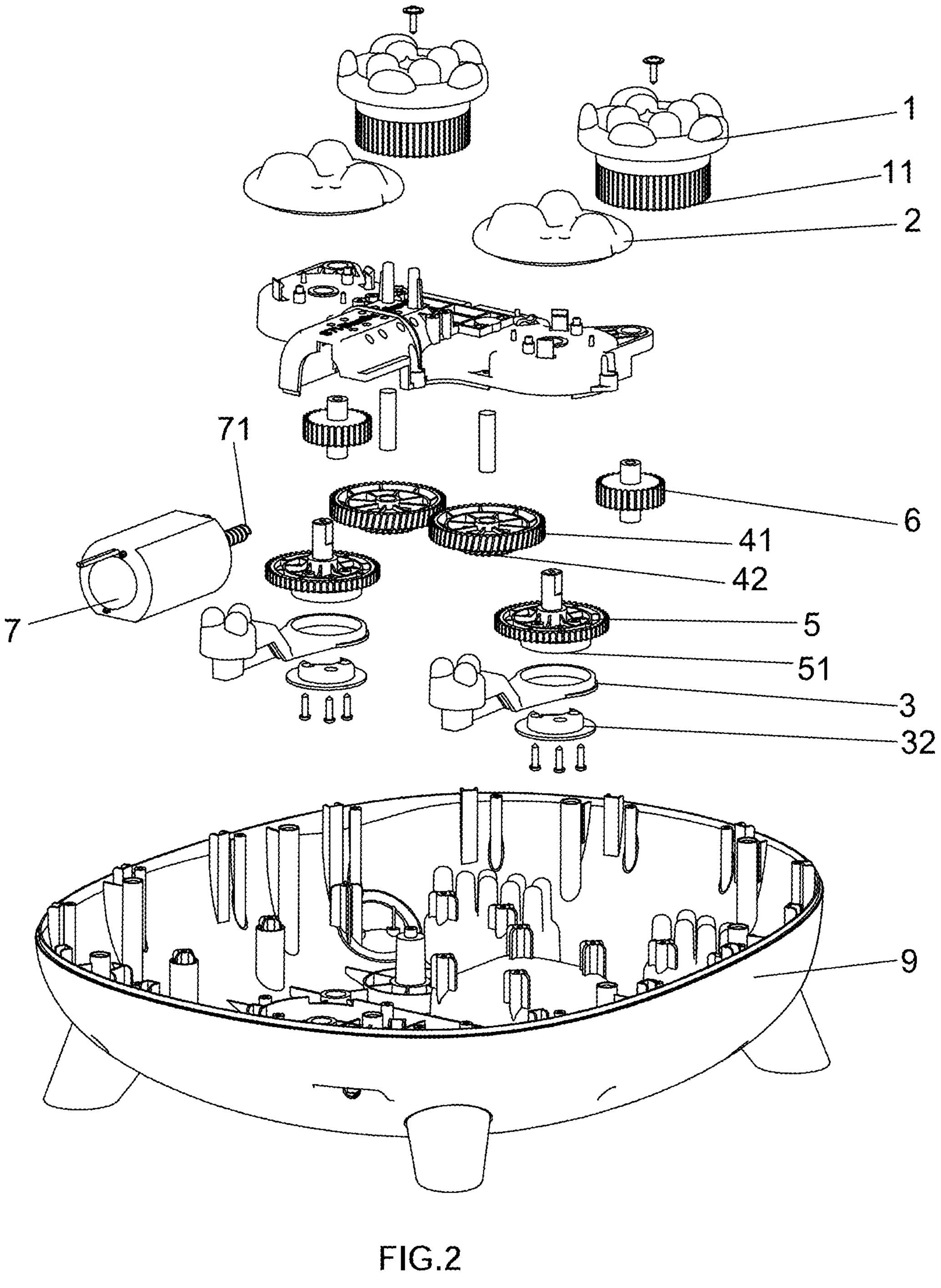
FIG. 2 is an exploded view of the foot massage arrangement according to the first embodiment of the present invention.

As shown in FIG. 1 and FIG. 2, the foot massage arrangement according to a first embodiment of the present inventions comprises a base 9 and a housing, wherein a massage mechanism is arranged in the base 9, wherein the massage mechanism comprises at least one toe massage head 1, at least one sole massage head 2, at least one heel massage head 3, at least one speed change gear 4, at least one massage gear 5, at least one steering gear 6 and at least one motor 7.

The motor 7 is installed at a rear side of the base 9, and two speed gears 4 are rotatably installed in the base 9 and are located on both sides of an output shaft of the motor 7. A screw shaft 71 is provided on the output shaft of the motor 7, and a turbine part 41 of the speed gear 4 is meshed with the screw shaft 71; the massage gear 5 is rotatably installed in the base 9 and the massage gear 5 is meshed with a gear part 42 of the speed gear 4.

The steering gear 6 is rotatably mounted in the base 9 and is provided in front of the corresponding massage gear 5, and the steering gear 6 and the massage gear 5 are meshed with each other; the sole massage head 2 is coaxially mounted above the corresponding massage gear 5.

An eccentric wheel 51 is provided on a bottom surface of the massage gear 5, and the heel massage head 3 is mounted on the eccentric wheel 51.

A bottom of the toe massage head 1 is coaxially mounted on a driving gear 11. The toe massage head 1 is rotatably mounted in the base 9 in front of the steering gear 6. The steering gear 6 and the driving gear 11 are meshed with each other.

When actually used, the motor 7 rotates to drive the two speed gears 4 to rotate, and the massage gears 5 also rotate accordingly. The toe massage head 1 and the heel massage head 3 are operatively coupled to the corresponding massage gear 5, so the the toe massage head 1 and the heel massage head 3 also perform massage actions. Specifically, the toe massage head 1 realizes rotational massage, and the heel massage head 3 realizes reciprocating linear motion in the forward and backward directions.

The massage gear 5 is connected to the corresponding steering gear 6, and the steering gear 6 cooperates with the driving gear 11 of the toe massage head 1, so as to drive the toe massage head 1 to rotate, thereby achieving toe massage.

Figure 3:
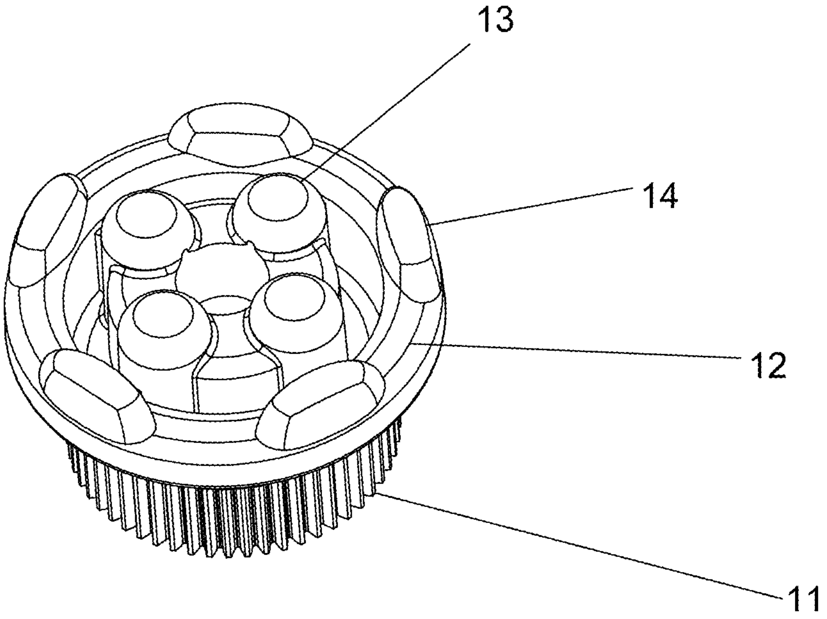
FIG. 3 is an enlarged schematic view illustrating a toe massage head of the foot massage arrangement according to the first embodiment of the present invention.

As shown in FIG. 3, the main body of the toe massage head 1 is a massage plate 12, the driving gear 11 is fixed to the bottom of the massage plate 12, an inner ring of convex points 13 is arranged around the middle of the upper surface of the massage plate 12, and an outer ring of convex points 14 is arranged around the outer periphery of the upper surface of the massage plate 12, thereby ensuring the comfort and massage effect of the toe massage.

Figure 4:
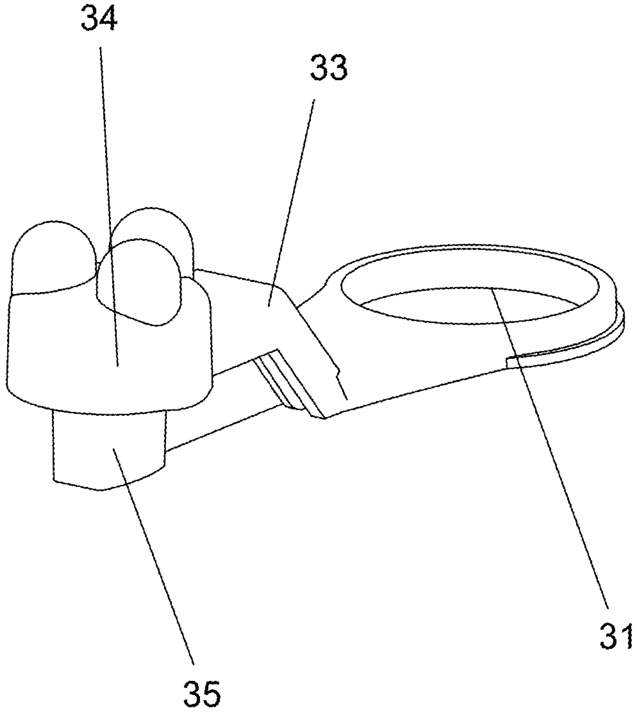
FIG. 4 is an enlarged schematic view illustrating a heel massage head of the foot massage arrangement according to the first embodiment of the present invention.
Figure 5:
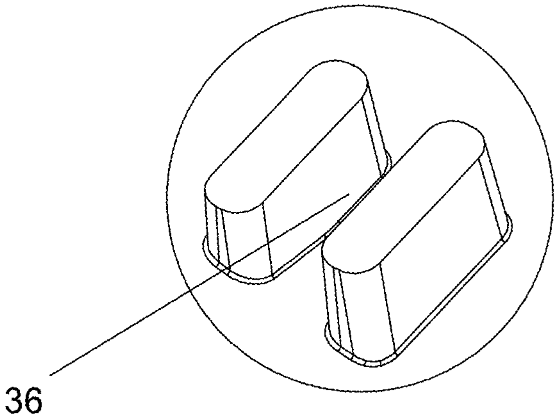
FIG. 5 is a partial enlarged schematic view illustrating a guide groove of the foot massage arrangement according to the first embodiment of the present invention.

As shown in FIG. 2, FIG. 4 and FIG. 5, each heel massage head 3 comprises an eccentric limiting ring 31, an eccentric cover 32, an extension arm 33 and a massage head 34, the eccentric limiting ring 31 is sleeved on the eccentric wheel 51, and the eccentric cover 32 is detachably connected to the bottom of the eccentric wheel 51, the extension arm 33 is connected to the rear part of the eccentric limiting ring 31, and the rear end of the extension arm 33 is connected to the massage head 34.

The base 9 is provided with at least one guide groove 36 extending forward and backward, and the bottom of the massage head 34 is provided with a guide ridge 35 which is extended into in the guide groove 36.

The eccentric limiting ring 31 is always mounted on the eccentric wheel 51 through the eccentric cover 32. Since the base 9 is provided with a guide groove 36 extending forward and backward, the bottom of the massage head 34 is provided with a guide ridge 35, and the guide ridge 35 is extended into the guide groove 36, so that the rotation of the eccentric wheel 51 drives the massage head 34 to reciprocate forward and backward.

The bottom surface of the guide groove 36 is a slope inclined in the front-to-back direction, so that in addition to the front-to-back massage effect, there is also an up-and-down massage effect during the heel massage process, which has a better massage comfort.

Figure 6:
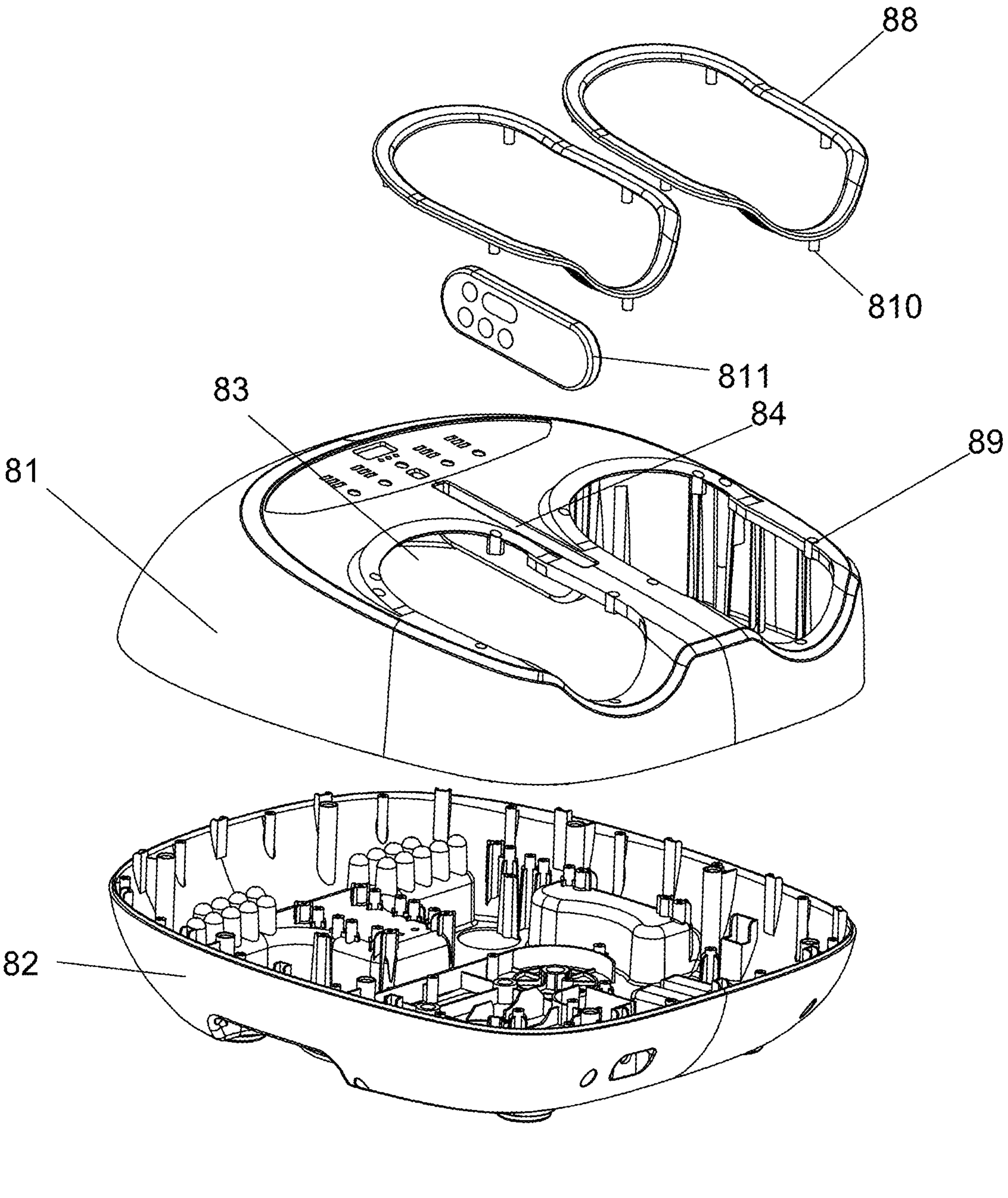
FIG. 6 is a perspective view of a foot massage arrangement according to a second embodiment of the present invention.
Figure 7:
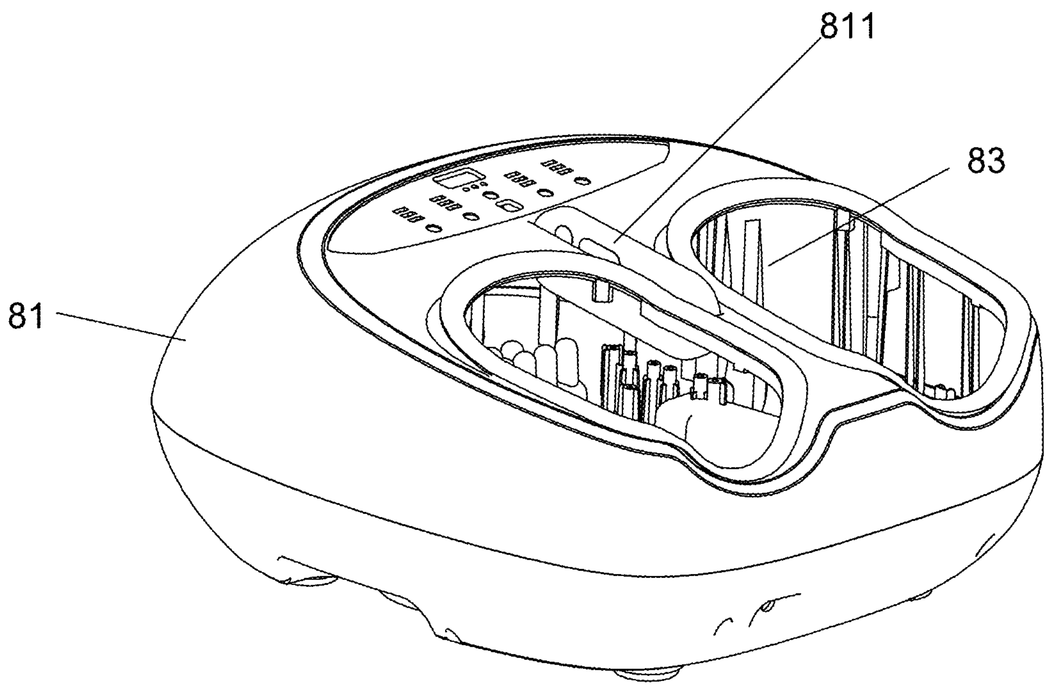
FIG. 7 is an exploded view of the foot massage arrangement according to the second embodiment of the present invention.
Figure 8:
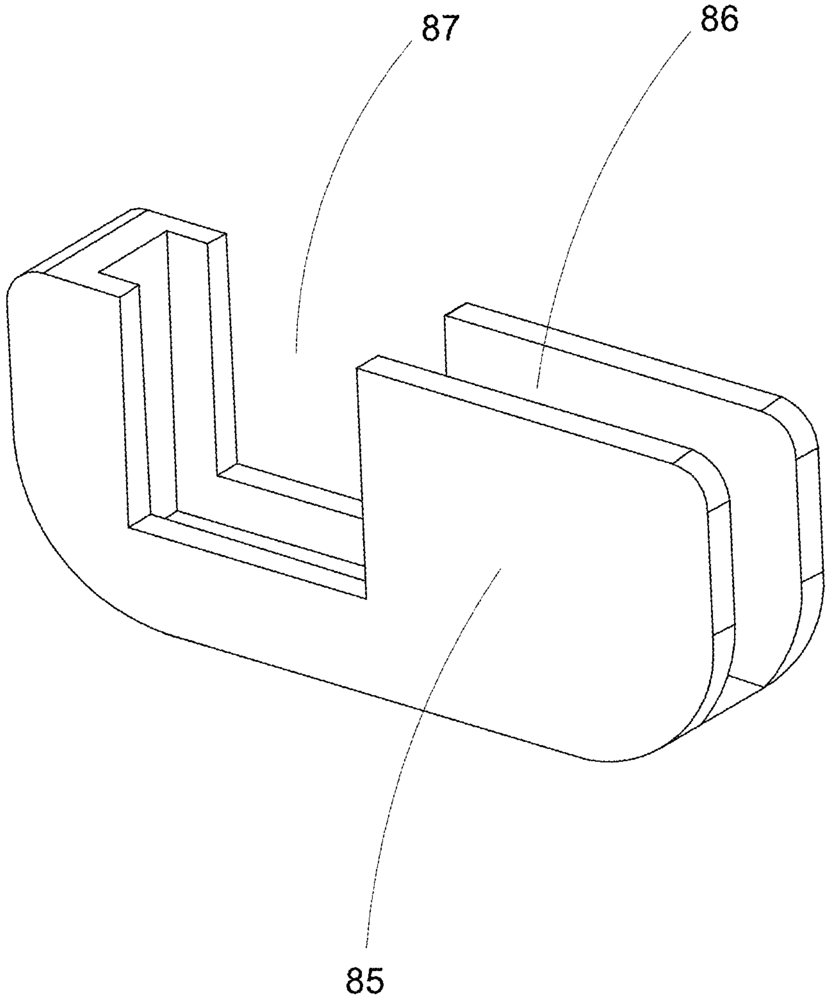
FIG. 8 is an enlarged perspective view illustrating a silicon body of the foot massage arrangement according to the second embodiment of the present invention.
Figure 9:
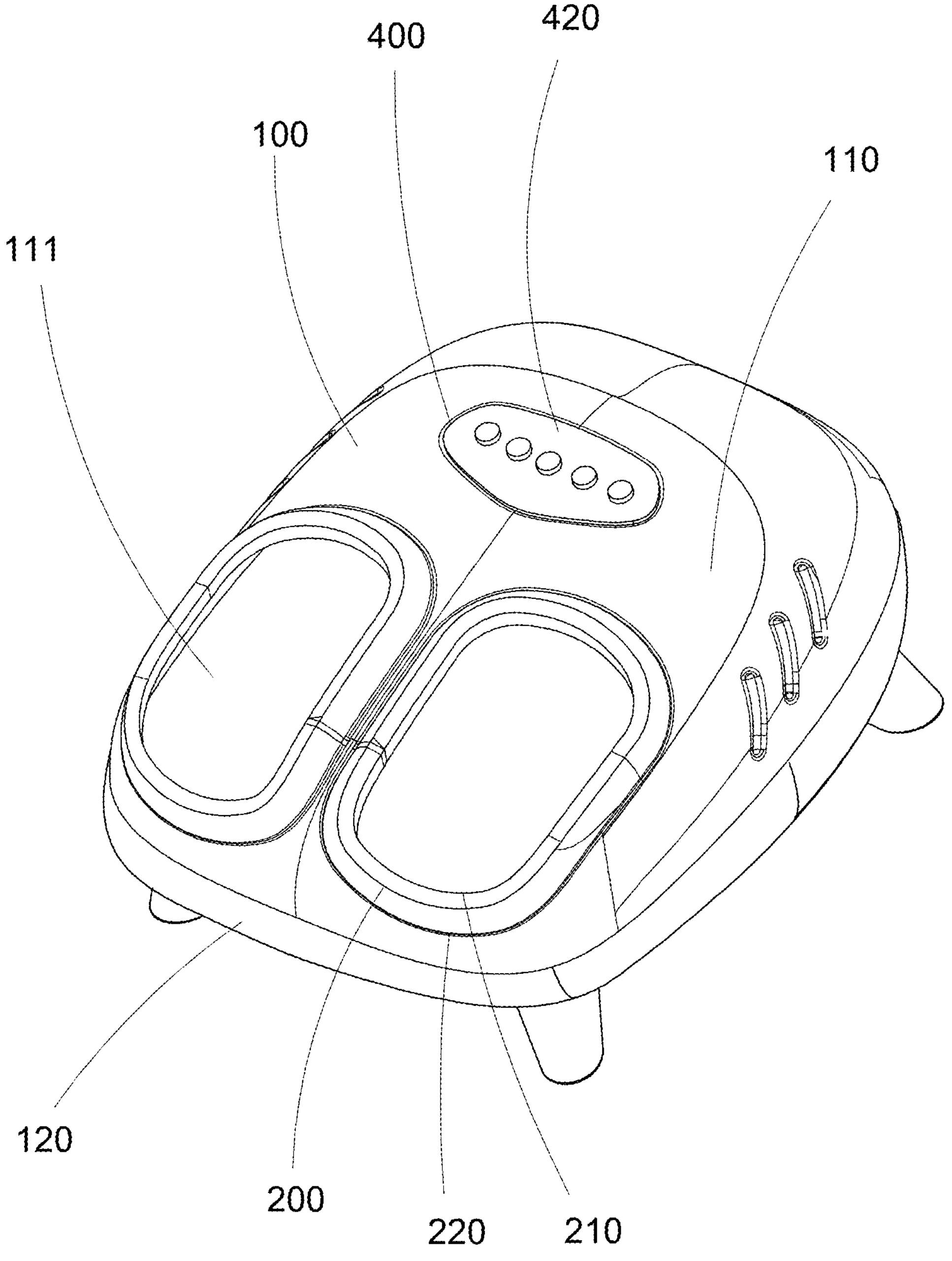
FIG. 9 is a perspective view of a foot massage arrangement according to a third embodiment of the present invention.

Please refer to FIGS. 6 to 8, a portable foot massage arrangement according to a second preferred embodiment comprises a lower shell 82 and an upper shell 81 assembled with the lower shell 82, the upper shell 81 is provided with an opening 83 for the foot to extend into, the upper shell 81 is provided with a remote controller placement area 84, and the remote controller placement area 84 is provided with a pre-tightening member for pre-tightening the remote controller 811.

The pre-tightening member comprises a silicone body 85, which is fixedly arranged inside the remote controller placement area 84. A groove 86 is provided on the top of the silicone body 85 for the remote controller 811 to be inserted into. The width of the groove 86 is smaller than the thickness of the remote controller 811. After the remote controller 811 is placed in the groove 86, it can be clamped by the silicone body 85, so that the remote controller 811 is placed stably. When the foot massage arrangement is in use, no abnormal sound will be generated in the remote controller placement area 84 due to vibration.

The length of the silicone body 85 is smaller than the length of the placement area, the outer wall of one end of the silicone body 85 is in contact with the inner wall of the remote controller placement area 84, and there is a reserved area between the other end and the remote controller placement area 84. One end of the groove 86 is open and connected to the reserved area. The length of the groove 86 is smaller than the length of the remote controller 811. After the remote controller 811 is placed in the groove 86, the tail end will extend to the reserved area. The operator can pick out the remote controller 811 through the reserved area for easy picking.

A through groove 87 is horizontally penetrated through the silicone body 85, and the through groove 87 is arranged corresponding to the key area of the remote controller 811 to prevent accidental key pressing of the remote controller 811 during the process of taking and placing the remote controller 811.

The upper shell 81 is provided with a detachable cloth pocket bracket 88 at the opening 83, and the tail end of the cloth pocket bracket 88 is arranged in an arc-shaped groove shape, so that the foot can be put in for massage more easily and naturally, and there will be no squeezing feeling at the Achilles tendon position.

The upper shell 81 is provided with a plurality of groups of insertion holes 89 at the top edge of the opening 83, and insertion rods 810 are respectively provided at the peripheral side of the bottom end surface of the cloth pocket bracket 88 corresponding to the insertion holes 89. The outer wall of the insertion rod 810 is covered with a rubber layer, and the rubber layer makes the insertion rod 810 and the insertion holes 89 form an interference fit. The cloth pocket bracket 88 can be disassembled and assembled by directly inserting the insertion rods 810 into the insertion holes 89, which is convenient for cleaning the cloth pocket.

After using the foot massage arrangement, the button area of the remote controller 811 can be directly aligned with the through groove 87 of the silicone body 85 and lowered until the remote controller 811 is pressed to the bottom of the groove 86. When using it next time, the operator can directly pull the remote controller 811 upward through the reserved area at the remote controller placement area 84; when the cloth pocket needs to be cleaned, the cloth pocket bracket 88 can be directly pulled upward by applying a pulling force. Pulling out the cloth pocket bracket 88 can drive the cloth pocket inside the foot massage arrangement to be pulled out for cleaning. When installation is required, it is only necessary to align the insertion rods 810 at the bottom end of the cloth pocket bracket 88 with the insertions holes 89 on the upper shell 81 and insert to complete the assembly.

Referring to FIGS. 9 to 18 of the drawings, a foot massage arrangement according to a third embodiment of the present invention is illustrated, the foot massage arrangement comprises a shell body 100, a pocket assembly 200, a massage assembly 300, and a control assembly 400. The massage assembly 300, the pocket assembly 200 and the control assembly 400 are assembled on the shell body 100. The massage assembly 300 is arranged to provide a massage effect to the foot of the user, the pocket assembly 200 is mounted on the shell body 100 for receiving at least one foot of the user, the control assembly 400 comprises a power source 410 which is arranged to drive the operation of the massage assembly 300 and a controller 420 for controlling the operation of the massage assembly 300.

Figure 10:
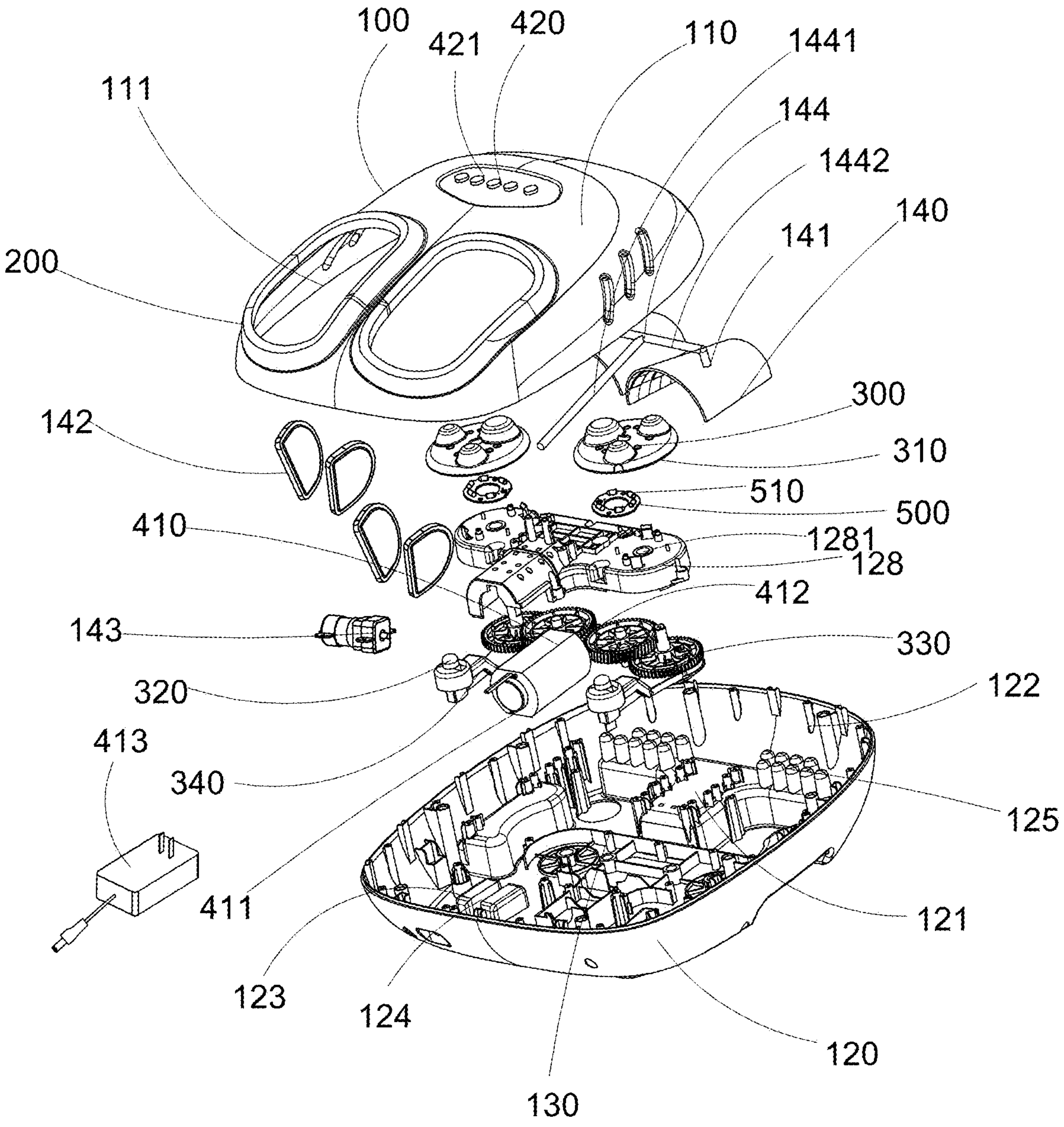
FIG. 10 is an exploded view of the foot massage arrangement according to the third embodiment of the present invention.

More specifically, as shown in FIG. 10, the shell body 100 comprises an upper shell 110 and a lower shell 120 which is assembled to the upper shell 110 to define a receiving cavity 130 for receiving the massage assembly 300. The connection manner between the upper shell 110 and the lower shell 120 is not limited. For example, screws or bolts can be used to secure the two shells together. This method provides a strong and durable connection and allows for easy disassembly if needed. Snap-fit joints where one shell has protrusions or tabs that fit into corresponding recesses or slots in the other shell. Hinges can be used to connect the two shells, allowing them to open and close like a door. This is often used for housings that need to be accessed frequently. It is also possible to utilize clips made from metal or plastic that attach to both shells, holding them securely together. The upper shell 110 also can be adhered to the lower shell 120 by a glue.

Figure 11:
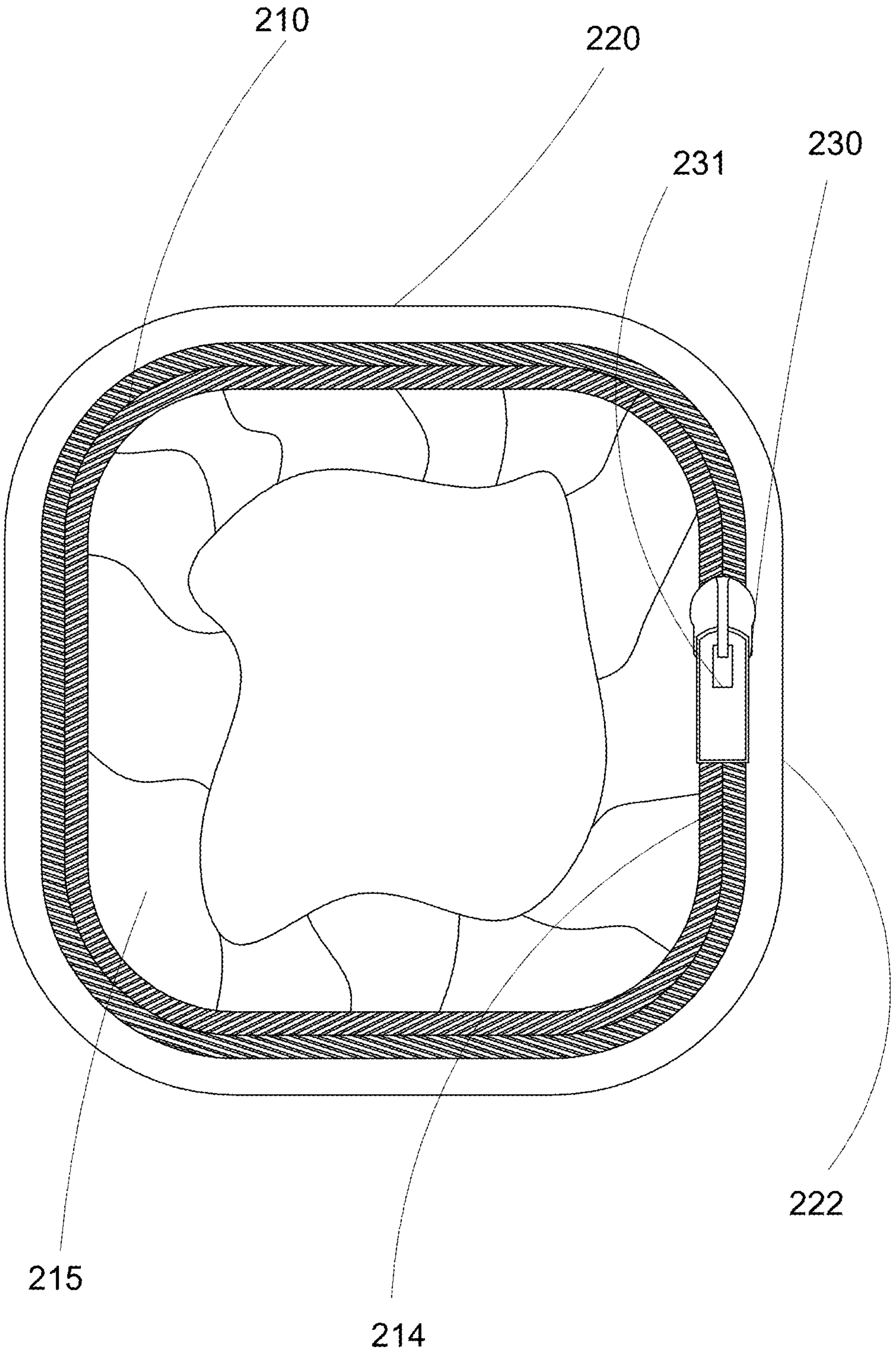
FIG. 11 is an enlarged schematic view illustrating a pocket assembly of the foot massage arrangement according to the third embodiment of the present invention.
Figure 18:
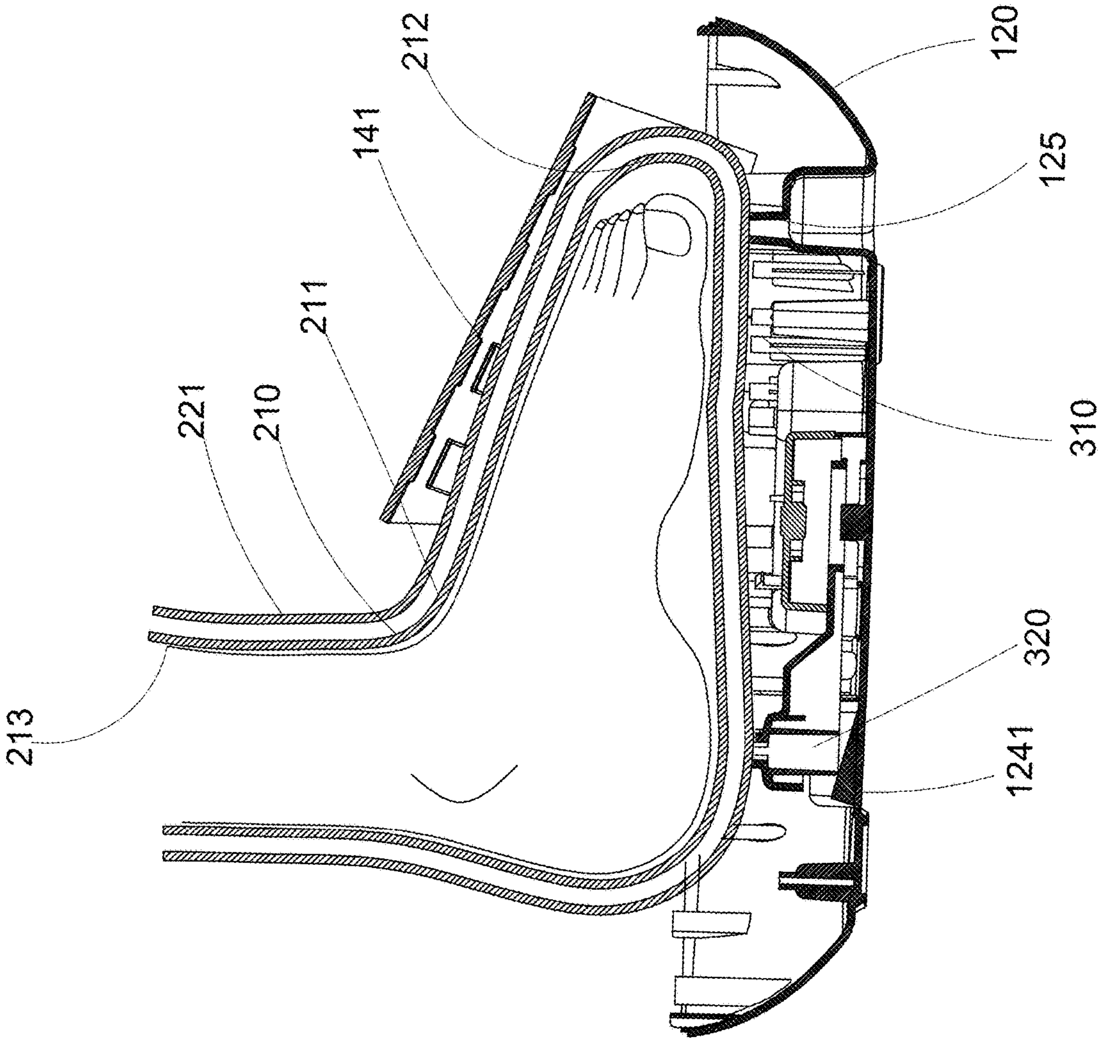
FIG. 18 is a sectional view illustrating the foot massage arrangement in a use state according to the third embodiment of the present invention.

According to this embodiment, with reference to FIG. 11 and FIG. 18, the pocket assembly 200 comprises at least one foot receiving pocket 210 for receiving a foot of the user and at least one fixing pocket 220 which is fixed to the shell body 100. The foot receiving pocket 210 can be disposed in the fixing pocket 220 for holding the foot of the user and can be detachable from the fixing pocket 220 for easy replacement and clean.

More specifically, the upper shell 110 has two openings 111 which are communicated to the receiving cavity 130 of the shell body 100, the pocket assembly 200 comprises two foot receiving pockets 210 and two fixing pockets 220, the two foot receiving pockets 210 are respectively disposed into the two fixing pockets 220 through the two openings 111. Accordingly, the two feet of the user can be respectively disposed into the two foot receiving pockets 210 through the two openings 111.

Each of the two foot receiving pockets 210 can be detachably mounted to the corresponding fixing pocket 220. As an example, the pocket assembly 200 comprises at least one connecting element 230 which is embodied as a zipper member 231 for detachably mounting the foot receiving pocket 210 with the corresponding fixing pocket 220.

Each of the two foot receiving pockets 210 provides a snug and secure fit for the user's foot, ensuring stability and comfort during use. Each of the fixing pockets 220, which is fixed to the shell body 100, anchors the corresponding foot receiving pocket 210, enhancing overall stability and preventing unwanted movement.

The detachable nature of each of the foot receiving pockets 210 allows for easy replacement, making it convenient to swap out worn or damaged pockets without needing to replace the entire assembly. The ability to detach each foot receiving pocket 210 from the corresponding fixing pocket 220 facilitates easy cleaning and maintenance, promoting hygiene and extending the lifespan of the foot massage arrangement of the present invention. The cleaning of the foot receiving pockets 210 helps to prevent the accumulation of sweat and dirt, thereby avoiding unpleasant odors and providing a consistently fresh and enjoyable user experience. In homes where multiple family members use the foot massage arrangement, these detachable pockets can be individually cleaned or replaced, guaranteeing each user a hygienic experience.

In addition, the user can have multiple foot receiving pockets 210, allowing for customization based on personal preference or specific activities, so that this adaptability enhances the versatility of the foot massage arrangement of the present invention. Each of the dedicated foot receiving pockets 210 can also be designed with comfort-enhancing features such as padding or ergonomic shaping, improving the overall user experience.

In other words, since the two foot receiving pockets 210 can be detached, they can be washed or replaced regularly, ensuring that they remain clean and free from odors, sweat, and bacteria. Each of the two fixing pockets 220, being a permanent part fixed to the shell body 100, does not come into direct contact with the user's foot. This design minimizes the risk of the fixing pockets 220 getting dirty, thus maintaining a clean interface and reducing the frequency of cleaning needed for each of the two fixing pockets 220 itself.

With each of the two foot receiving pockets 210 being detachable, maintenance becomes straightforward. The user can simply remove and wash or replace the corresponding foot receiving pockets 210 as needed without disturbing the rest of the assembly. Each of the two fixing pockets 220 is less exposed to wear and tear because it does not come into direct contact with the foot. This means it is less likely to degrade over time, extending the overall lifespan of the foot massage arrangement.

Each of the two foot receiving pockets 210 and the two fixing pockets 220 is made of a flexible material, such as polypropylene, polyethylene, polyvinyl chloride, fabric, rubber, nylon, tyvek, and polyester. Polypropylene is a lightweight and breathable material. Polyethylene is durable and waterproof. PVC pockets offer excellent waterproofing and chemical resistance. Fabric pockets are breathable and comfortable. Rubber pockets provide excellent grip and durability. Nylon pockets are lightweight, durable, and offer good resistance to wear and tear. Tyvek is a synthetic material known for its durability and resistance to liquids and particulates. Polyester may be used in reusable pockets, offering a balance of protection and comfort.

Referring to FIG. 18, each of the two fixing pocket 220 is connected to one of the upper shell 110 and the lower shell 120. According to this embodiment, each of the two fixing pocket 220 is connected to the lower shell 120 and the upper shell 110. More specifically, the lower shell 120 comprises a bottom wall 121 and a surrounding wall 122 extended from a peripheral edge of the bottom wall 121. Each of the two fixing pockets 220 includes a distal end portion which is connected to the surrounding wall 122 of the lower shell 120 and an approximate end portion which is connected to the upper shell 10 adjacent to the two openings 111. In other words, the two openings 111 may be formed at a font side portion of the upper shell 110, the distal end portion of each fixing pocket 220 is connected to the lower shell 120 at a rear side portion of the lower shell 120, so that each fixing pocket 220 is substantially extended in a length direction of the foot massage arrangement for guiding the foot of the user to be naturally placed on the massage assembly 300.

Accordingly, when each of the two foot receiving pockets 210 is taken out from the corresponding fixing pocket 220, each of the two fixing pockets 220 is remained to be secured on the lower shell 120.

The foot receiving pockets 210 and the fixing pockets 220 can be made of a same flexible material, and the zipper member 231 can be arranged to detachably mount the foot receiving pocket 210 to the corresponding fixing pocket 220. More specifically, each of the foot receiving pockets 210 comprises a pocket body 211 for receiving the foot of the user, the pocket body 211 includes a closed end 212 and an open end 213 which is provided with an opening edge 214 for defining an access opening 215 of the pocket body, the opening edge 214 of the foot receiving pocket 210 can be mounted to an edge 222 of the fixing pocket 220 which comprises a fixing pocket body 221 for receiving the corresponding foot receiving pocket 210.

According to this embodiment, the controller 420 for controlling the operation of the massage assembly 300 can be mounted on a top of the upper shell 110, and a control interface 421 of the controller 420 can be exposed for facilitating the user to operate. The control interface 421 may comprises pressing buttons or may be embodied as a touch screen.

Referring to FIG. 10, the power source 410 of the control assembly 400 comprises a motor 411, an output shaft 412 and a power module 413 electrically coupled to the controller 420 and the motor 411. The power module 413 may comprise a rechargable battery that supplies an electric power to the controller 420 and the motor 411. The rechargeable battery 413 can be but not limited to nickel-cadmium battery, nickel-hydrogen battery, lead-acid battery, lithium-ion battery, and lithium-polymer battery. Alternatively, the power module 413 is adapted for being connected to an external power source so that the external power source is able to supply electric energy to the controller 420 and the motor 411.

The massage assembly 300 comprises at least one sole massage head 310 for massaging a sole of the foot of the user, at least one heel massage head 320 for massaging a heel of the foot of the user, at least one first transmission unit 330 coupled to the power source 410 for driving the movement of the sole massage head 310, and at least one second transmission unit 340 which is capable of being driven by the power source 410 to drive the movement of the heel massage head 320.

In this embodiment, the foot massage arrangement is arranged for massaging both of the two feet of the user, and thus the massage assembly 300 comprises two sole massage heads 310 for massaging the soles of the two feet of the user, two heel massage head 320 for massaging heels of the two feet of the user, two first transmission units 330 coupled to the power source 410 for driving the movement of the sole massage head 310, and two second transmission units 340 which are capable of being driven by the power source 410 for driving the movement of the two heel massage heads 320.

According to this embodiment, the massage assembly 300 is coupled to the motor 411 in a manner that the motor 411 is capable of driving the movement of all of the sole massage heads 310 and the heel massage heads 320. In addition, the sole massage heads 310 move simultaneously with the heel massage heads 320, so that the soles and heels of the two feet of the user can be simultaneously massaged.

More specifically, referring to FIGS. 12 to 15, in this embodiment, the output shaft 412 of the power source 410 is a screw shaft which comprises engaging screws 4121, each first transmission units 330 comprises a first gear element 331 coupled to the output shaft 412 of the power source 410, a second gear element 332 coupled to the first gear element 331, and a driving arm 333 connected to the second gear element 332 for driving the rotation movement of the corresponding sole massage head 310.

Accordingly, the first gear element 331 comprises an upper teeth portion 3311 which is engaged with the engaging screws 4121 of the output shaft 412 of the power source 410, and a lower teeth portion 3312 which is engaged and meshed with engaging teeth 3321 of the second gear element 332, so that when the motor 411 is in operation, the output shaft 412 is rotating to drive the first gear element 331 to rotate, and thus the second gear element 332 is driven to rotate by the first gear element 331, and the driving arm 333 connected to a center of the second gear element 332 is driven to rotate, so as to drive the corresponding sole massage head 310 to rotate for massaging the sole of the foot of the user.

Each sole massage head 310 comprises a rotating plate 311 and a plurality of sole massage protrusions 312 integrally extended from the rotating plate 311 for extending into tissues of the sole of the foot of the user during the massage operation. The rotating plate 311 has a central hole 313 for mounting the driving arm 333. Accordingly, the driving arm 333 is penetrating through the central hole 313 of the rotating plate 311, so that when the driving arm 333 is driven to rotate by the second gear element 332, the rotating plate 311 will corresponding be drive to rotate, so that the massage protrusions 312 are driven to rotate for massaging the sole of the foot of the user.

Figure 12:
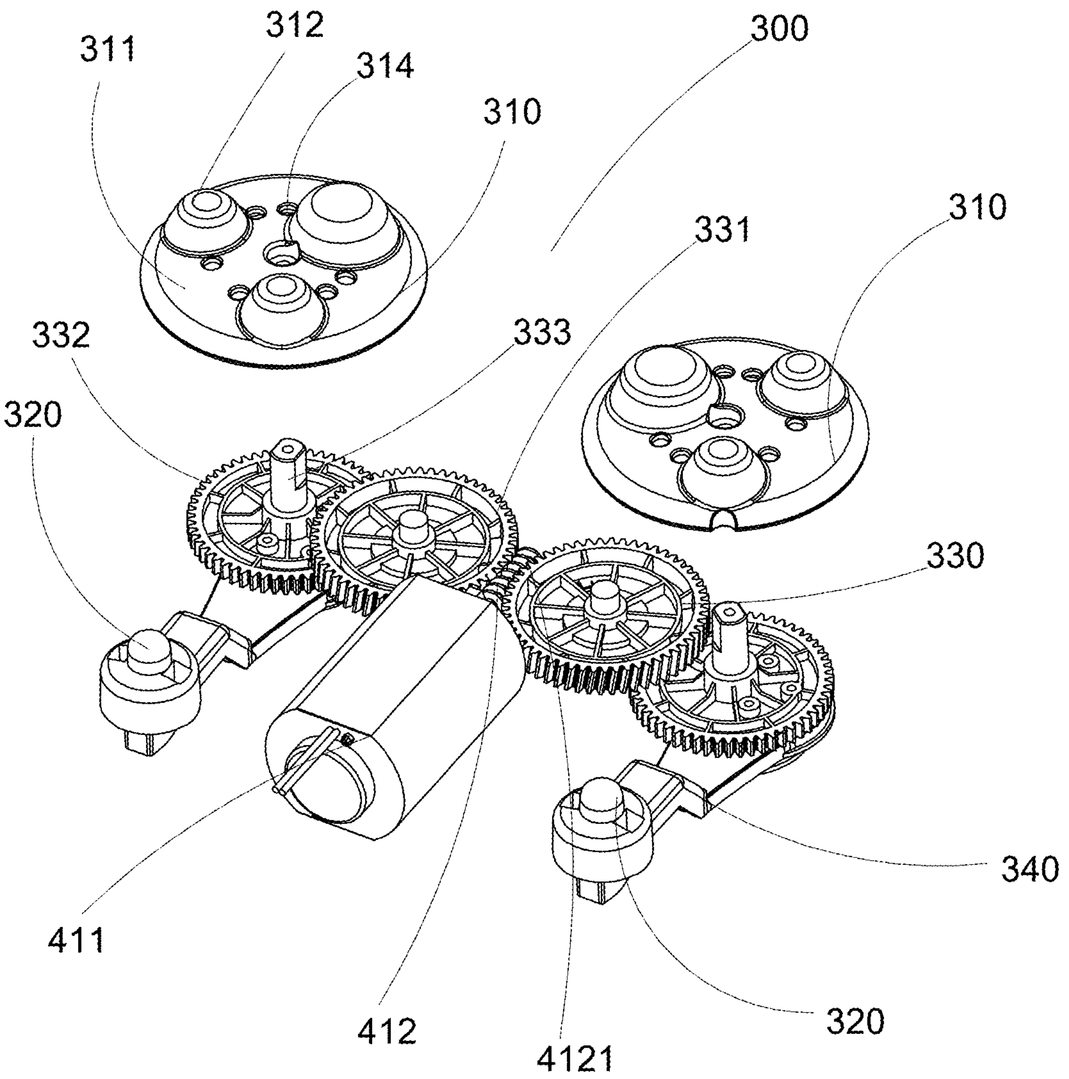
FIG. 12 is a perspective view illustrating a massage assembly of the foot massage arrangement according to the third embodiment of the present invention.
Figure 15:
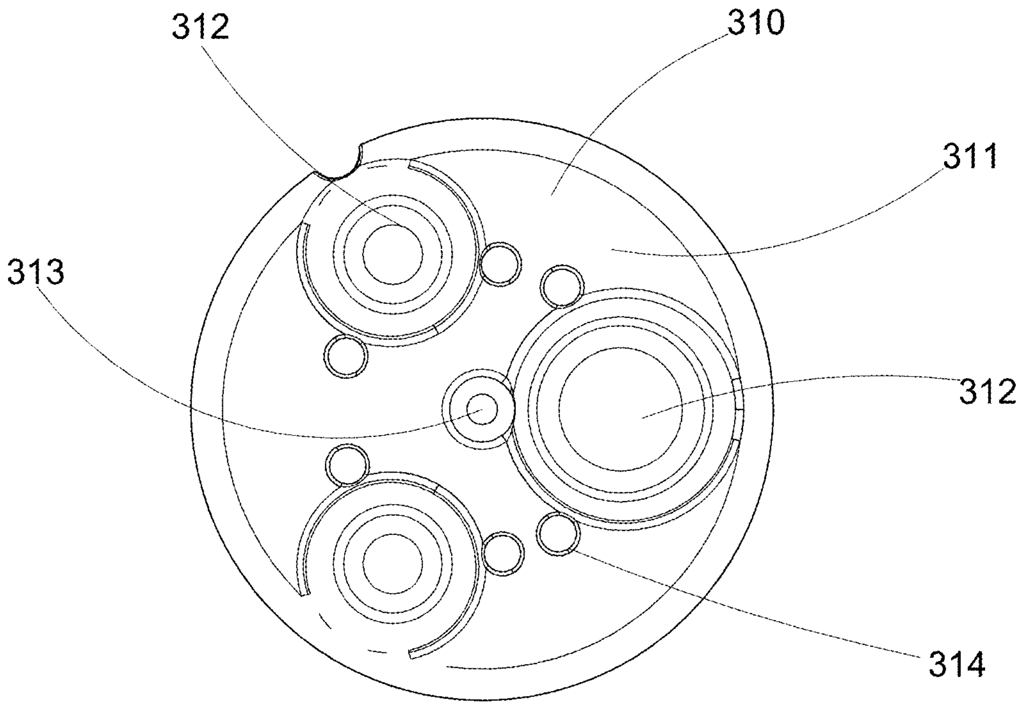
FIG. 15 is an enlarged schematic view illustrating a sole massage head of the foot massage arrangement according to the third embodiment of the present invention.

As shown in FIGS. 12 and 15 of the drawings, each sole massage head 310 comprise three sole massage protrusions 312 which are evenly distributed on the rotating plate 311 for evenly massage the sole of the foot of the user. The three sole massage protrusions 312 ensure that pressure is evenly applied across the entire sole, and this balanced distribution can effectively alleviate tension and stress in the foot muscles.

Each sole massage protrusion 312 is configured to be a circular boss featuring a gradually increasing diameter from top to bottom. This tapering circular boss design of each protrusion ensures a smooth and consistent massage as the protrusions rotate. This shape also allows for gradual pressure application and release, mimicking the natural motion of a hand massage and effectively stimulating the nerve endings and acupressure points on the sole of the foot. This can promote better blood circulation, reduce foot fatigue, and potentially improve overall foot health.

Among the three sole massage protrusions 312, one sole massage protrusion 312 can be configured to have a larger diameter, so that the combination of one larger protrusion with two smaller ones allows for varied stimulation across the sole. This variety can enhance the overall massage experience, preventing monotony and ensuring that different parts of the foot receive different types of pressure and motion.

The sole of the foot has a large surface area with various muscles, tendons, and ligaments that can benefit from the broad, rotating motions of the sole massage protrusions 312 The rotating action can cover the complex structure of the sole more effectively than a linear massage. The sole contains numerous acupressure points that are linked to various organs and systems in the body, according to reflexology. A rotating sole massage head 310 can stimulate these points in a dynamic and comprehensive manner, potentially providing therapeutic benefits beyond just the foot.

In addition, the sole has natural cushioning and flexibility, which allows it to adapt well to the rotating motion of the sole massage head 310. This flexibility helps in absorbing and distributing the pressure evenly, enhancing the massage experience. Rotational massage can help improve blood flow and circulation in the foot by stimulating the muscles and tissues more dynamically. This can lead to better oxygenation and relaxation of the foot muscles.

The design of the circular boss protrusions with varying diameters can target different depths of tissue in the sole, providing a multi-dimensional massage. This can help in addressing both superficial and deep tissue issues.

Each second transmission unit 340 is coupled to the second gear element 332 to drive the corresponding heel massage head 320 to move to massage the heel of the foot of the user. According to this embodiment, each heel massage head 320 is driven to be reciprocating to massage the heel of the foot of the user. Accordingly, each heel massage head 320 is moving back and forth during the operation, and the movement of each heel massage head 320 is a linear movement.

More specifically, each second transmission unit 340 comprises an eccentric pin 341 extended from a bottom of the second gear element 332, and an extension arm 342 having a retention hole 3421 at one end thereof, the other end of the fixing arm 342 is connected to the corresponding heel massage head 320.

Accordingly, when the second gear element 332 is driven to rotate, the extension arm 342 will be driven by the eccentric pin 341 to linearly move, so that the corresponding massage head 320 will be driven to move back and forth to massage the heel of the foot of the user.

As shown in FIG. 10, the lower shell 120 comprises two set of guide ridges 123 which are protruded from the bottom wall 121, and a guide groove 124 is defined between each set of two guide ridges 123 for guiding the movement of the corresponding heel massage head 320. In other words, when each heel massage head 320 is driven to move by the second transmission unit 340, the linear movement of the corresponding heel massage head 320 is limited and guided in the corresponding guide groove 124.

Figure 13:
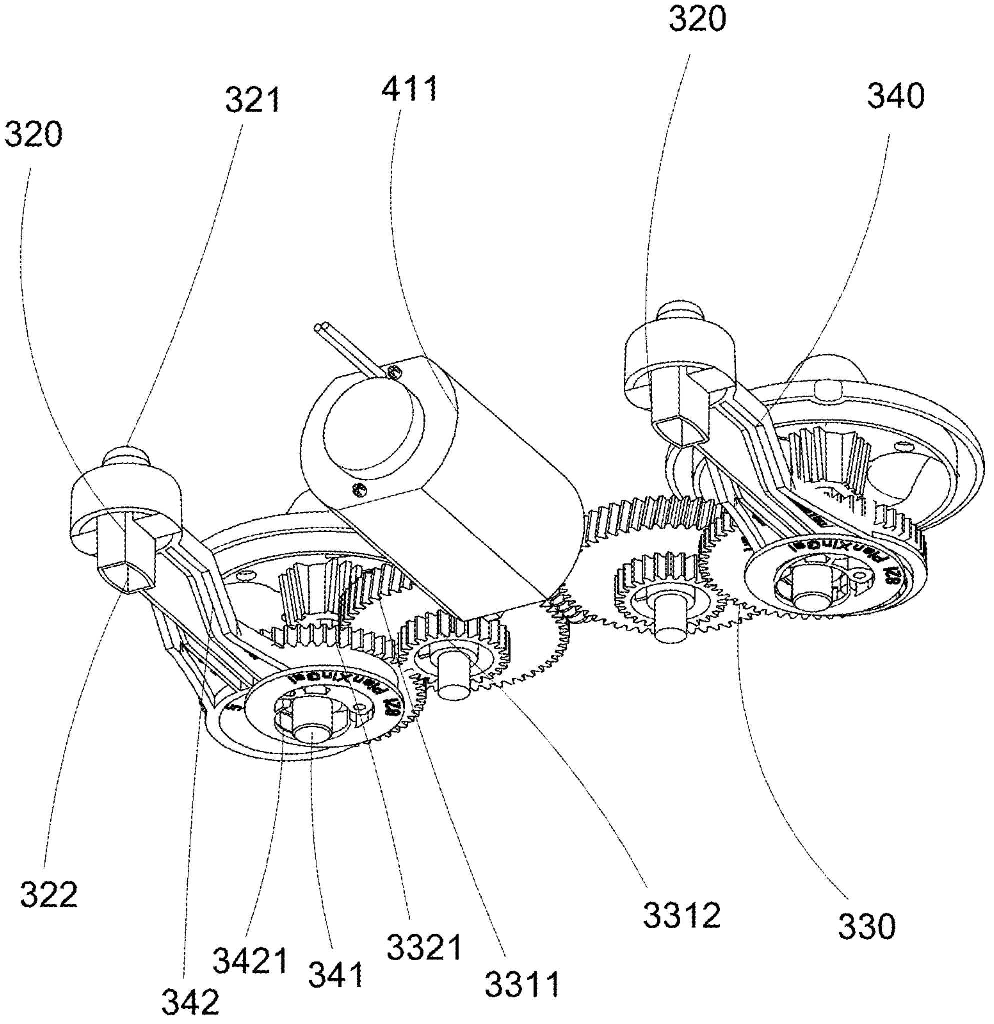
FIG. 13 is another perspective view illustrating the massage assembly of the foot massage arrangement according to the third embodiment of the present invention.

Referring to FIG. 10 and FIG. 13, each heel massage head 320 comprise an upper end portion 321 which is extended out of the guide groove 124 for massaging the heel of the user, and an lower portion 322 which is sliding in the corresponding guide groove 124 for guiding the linear movement of each heel massage head 310.

The guide ridges 123 and guide grooves 124 ensure that the corresponding heel massage heads 320 move in a precise linear path. This guided movement reduces the risk of misalignment or deviation, so as to provide a consistent and accurate massage experience, and facilitate a smooth linear movement of the heel massage heads 320, so that this smooth operation enhances the user's comfort, providing a seamless and relaxing massage.

The heel comprises the calcaneus bone, which is covered by a thick layer of fatty tissue and a dense network of nerves and blood vessels. The linear motion of the heel massage head 320 can target these tissues more precisely, providing therapeutic benefits without causing discomfort or irritation.

Linear massage of each heel massage head 320 can evenly distribute pressure along the heel's length. This even distribution helps in relieving stress and tension in the plantar fascia, a ligament that runs along the bottom of the foot and connects the heel bone to the toes.

In addition, the heel often suffers from conditions like plantar fasciitis, where the plantar fascia becomes inflamed. Linear massage provided by the corresponding heel massage head 320 can effectively target and soothe the affected areas by applying consistent, controlled pressure, which is more difficult to achieve with rotating movements.

Rotating massage can sometimes create uneven pressure points and may lead to discomfort or bruising, especially in sensitive areas like the heel. Linear massage offers a gentler and more controlled approach, reducing the risk of discomfort or injury. Linear massage can mimic the natural motion of manual massage techniques, such as kneading and stretching, which are effective for breaking up adhesions, increasing blood flow, and promoting healing. This type of massage can more effectively address the unique needs of the heel.

Furthermore, the natural movement of the foot during walking or running involves linear forces. A linear massage can complement this natural movement, aiding in the recovery and relaxation of the muscles and tissues involved.

Accordingly, the heel's anatomical structure, sensitivity, and the nature of common heel ailments make it more suitable for linear massage. Linear massage of each heel massage head 320 of the present invention offers precise, controlled, and therapeutic benefits that align with the needs of the heel, making it a more effective and comfortable option compared to rotating massage.

Figure 17:
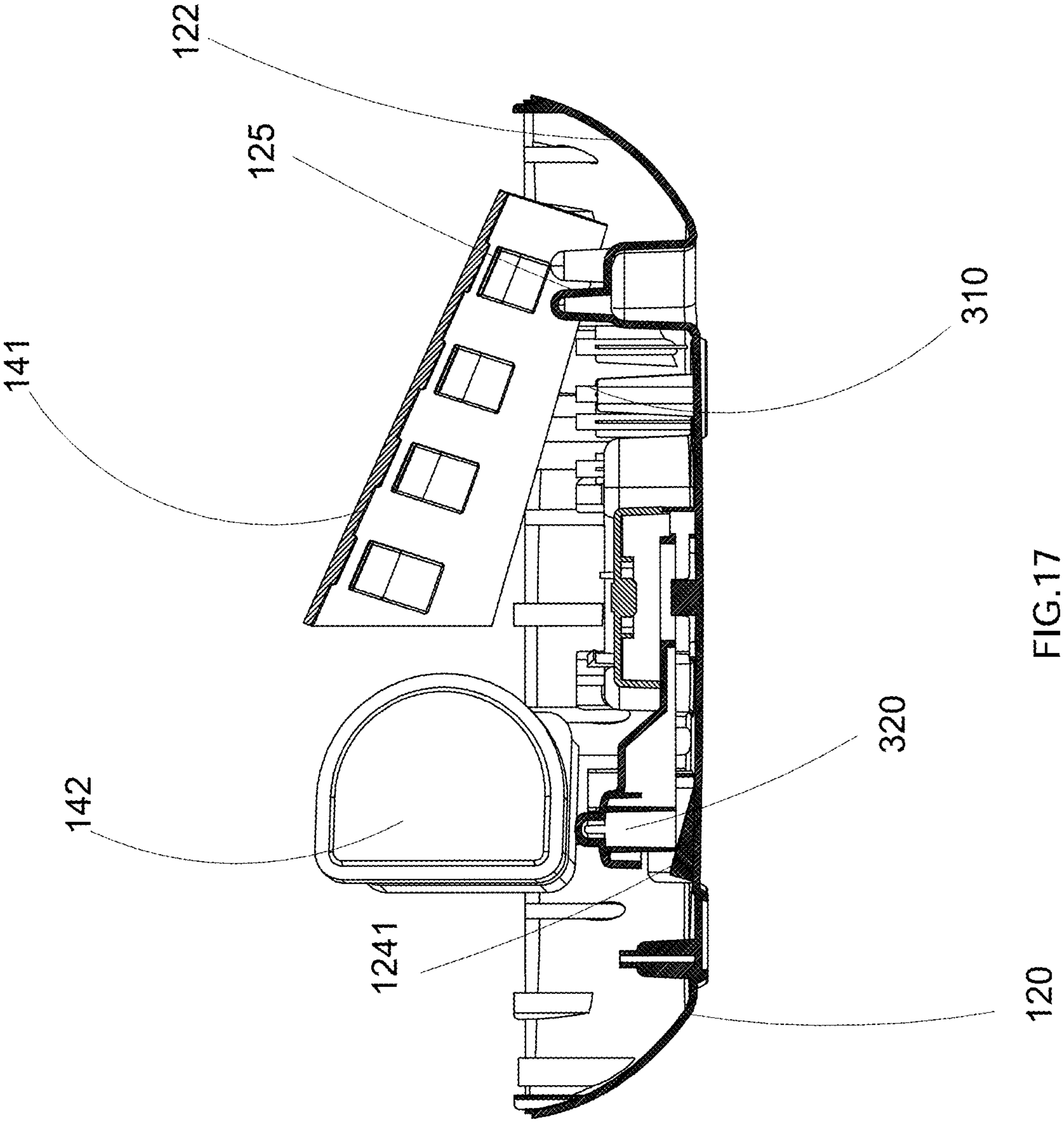
FIG. 17 is a sectional view illustrating the massage assembly in the lower shell of the foot massage arrangement according to the third embodiment of the present invention.

As shown in FIG. 17 and FIG. 18 of the drawings, a bottom floor 1241 is formed at a bottom of the corresponding guide groove 124, preferably, the bottom floor 1241 is an inclined surface, and the more the inclined surface faces towards the heel, the higher its elevation. Accordingly, when each heel massage head 320 is moving along the corresponding guide groove 124, the lower portion 322 of each heel massage head 320 is sliding on the inclined surface, so as to adjust the height of the upper end portion 321 of the corresponding heel massage head 320.

The inclined bottom floor 1241 allows the height of the upper end portion 321 of the heel massage head 320 to be adjusted dynamically as it moves along the guide groove 124. This ensures that the heel massage head 320 can adapt to the contours of the heel, providing a more tailored and effective massage. In addition, when the heel massage head 320 moves toward the heel and the upper end portion 321 adjusts its height, the massaging depth extends deeper into the heel tissues. This deeper penetration can provide more effective relief by targeting underlying muscles and tendons.

In addition, adjusting the massage depth into the heel by the inclined surface also adjusts the gesture of the sole, allowing the sole massage head 310 to penetrate deeper into the sole. This dual adjustment ensures comprehensive massage coverage for both the heel and sole. By optimizing the contact angles and depths for both the heel and sole, the device can deliver more effective and thorough massage therapy.

According to this embodiment, the two sole massage heads 310 and the two heel massages heads 320 are driven to the move by the same motor 411. The two first transmission units 330 and the two second transmissions units 340 are respectively provided at two opposite sides of the output shaft 412. The two first gear elements 331 are respectively meshed to two opposite sides of the output shaft 412.

In addition, in this embodiment, the second gear element 332 which is engaged with the corresponding first gear element 331 is arranged for simultaneously driving the rotation of the corresponding sole massage head 310 by the driving arm 333 above the first gear element 331 and the linear movement of the corresponding heel massage head 320 by the eccentric pine 341 under the first gear element 331.

The second gear element 332 enables the simultaneous operation of both the corresponding sole massage head 310 and the corresponding heel massage head 320. This synchronized movement ensures a comprehensive massage experience, addressing multiple areas of the foot at the same time. And by integrating both rotational and linear movements into a single driving mechanism, the design maximizes the use of space and reduces the number of separate components needed. This efficiency can lead to a more compact and cost-effective device.

The person of ordinary skilled in the art should understand the structures of the first transmission units 330 and the second transmission units 340 of the present invention are exemplary only, and other suitable transmission mechanism can be adopted for driving the operation of both the corresponding sole massage head 310 and the corresponding heel massage head 320.

Figure 14:
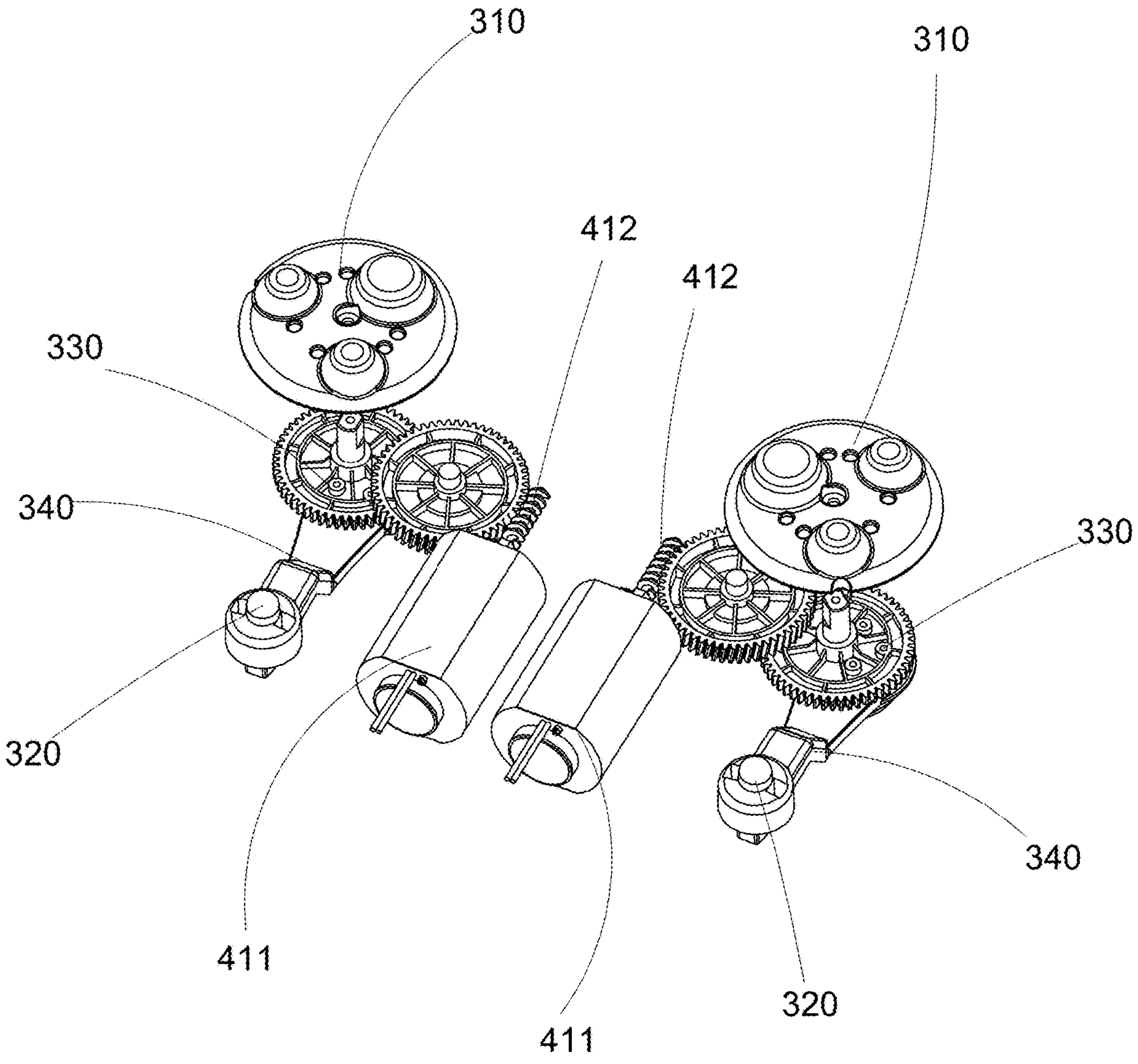
FIG. 14 is another perspective view of the massage assembly of the foot massage arrangement according to a first alternative mode of the third embodiment of the present invention.

Alternatively, as shown in FIG. 14 of the drawings, the power source 410 of the control assembly 400 may comprise two motors 411, two output shafts 412 and a power module 413 electrically coupled to the controller 420 and the motors 411. The two output shafts 412 are respectively extended from the two motors 411. In this embodiment, one motor 411 is used for driving one set of massage unit comprising one sole massage head 310, one heel massage head 320, one first transmission unit 330 and one second transmission unit 340. The speeds of the two motors 411 can be adjusted, so that the the two sets of massage units can provide different massage effects for the two feet of the user.

Each motor 411 drives a separate set of massage units, allowing for independent control of the massage on each foot. This independence enables customized massage experiences tailored to the specific needs and preferences of each foot. With adjustable speeds for the two motors, users can receive different massage effects on each foot. This customization can cater to individual preferences, such as a more intense massage on one foot and a gentler massage on the other. In addition, different feet may have different therapeutic needs. For example, one foot may require a deeper tissue massage to relieve pain, while the other may benefit from a more relaxing, surface-level massage. The ability to adjust the massage effects for each foot can enhance the overall therapeutic benefits.

Referring to FIG. 10, FIG. 17 and FIG. 18, the lower shell 120 further comprises two set of protrusion pins 125 which are respectively protruded from the bottom wall 121 for massaging the toes of the user. Each of the two sets of protrusion pins 125 comprises a plurality of protrusion pins 125 and two adjacent protrusion pins 125 are spaced apart from each other.

The shell body 100 further comprises an air cushioning assembly 140 which comprises two air cushioning covers 141 for providing an air cushioning effect to the soles of the two feet of the user respectively, two sets of heel cushioning pads 142 for providing an air cushioning effect to the heels of the two feet of the user respectively, and an air pump 143 for pumping air into the air cushioning cover 141 and the heel cushioning pads 142.

In this embodiment, as shown in FIG. 18 of the drawings, each foot receiving pocket 210 is disposed into the fixing pocket 220 and the arrangement of the pockets are partially covered under the air cushioning cover 141, when the air cushioning cover 141 is inflated by the air pump 143, the sole between the heel and the toes of the foot of the user is air cushioned by the air cushioning cover 141 above it.

In addition, the sole air cushioning over 141 is configured to be arch-shaped, so as to conform to the natural curve of the foot, providing a more comfortable and supportive massage experience. This ergonomic design reduces discomfort and ensures a snug fit, and the arch shape distributes pressure evenly across the foot, avoiding concentrated pressure points that could cause discomfort or pain. This even distribution enhances the overall massage effect and ensures a more pleasant experience.

By conforming to the natural arch of the foot, the air cushioning cover 141 helps maintain proper foot alignment during the massage. This alignment can reduce strain on the foot muscles and joints, promoting better posture and foot health.

In this embodiment, the air cushioning cover 141 is further extended to a position above the toes of the user. Accordingly, when the air cushioning cover 141 is inflated, the toes of the user are sandwiched between the corresponding set of protrusion pins 125 and the inflated air cushioning cover 141, so as to enhance the massage effect to the toes of the user. This arrangement enhances the massage effect on the toes by providing pressure from both sides, leading to a more comprehensive and effective massage.

In other words, when the toes are placed in position and the air cushioning cover 141 above inflates, the air cushioning cover 141 presses the toes against the protrusion pins 125. This action provides an effective massage by squeezing the toes between the corresponding inflated sole cushion cover 141 and the protrusion pins 125.

Furthermore, when the air cushioning cover 141 is inflated, a bottom of the air cushioning cover 141 is pressed on a top surface of the sole of the foot of the user (the instep of the foot of the user), while a bottom surface of the sole of the foot (the underside of the sole) is supported on the corresponding sole massage head 310, so as to be massaged by the corresponding sole massage head 310, so that the sole of the user is sandwiched between the air cushioning cover 141 and the corresponding sole massage head 310, and the massage effect of the corresponding sole massage head 310 is enhanced because the pressing effect of the air cushioning cover 141 will allow the massage protrusions 312 to extend deeper into the tissues of the underside of the sole of the foot of the user.

In addition, the air pump 143 can be configured to rhythmically inflate and deflate the air cushioning cover 141, so as to enhance the massage effect to the sole of the user which is sandwiched between the air cushioning cover 141 and the corresponding sole massage head 310. In other words, the rhythmic inflation and deflation of the air cushioning cover 141 create varying pressure on the sole, simulating a dynamic massage experience that can more effectively stimulate blood flow and muscle relaxation.

The air cushioning assembly 140 further comprises an air filling pipe unit 144 which comprises a guide pipe 1441, and a plurality of feeding pipes 1442 communicated to the guide pipe 1441 for feeding the air into the corresponding air cushioning covers 141 and the heel air cushioning covers 142.

In this embodiment, an end of the feeding pipe 1442 for filling air into the corresponding the air cushioning cover 141 is located at a center on top of the air cushioning cover 141. positioning the air inlet at the center on top of the air cushioning cover 141 ensures that air is distributed evenly throughout the cover during inflation. This uniform inflation helps maintain a consistent cushioning effect across the entire surface, enhancing user comfort and effectiveness of the massage. A centrally located air inlet also allows for balanced inflation, reducing the risk of uneven pressure distribution that could cause instability. This balance ensures that the foot remains securely in place during the massage, preventing slippage and enhancing the overall massage experience. Furthermore, the central position of the air inlet optimizes the air flow into the air cushioning cover 141, reducing the time required for inflation and deflation. This efficiency makes the device more convenient to use, allowing for quick adjustments to the cushioning level.

Each set of heel cushioning pads 142 comprises two heel cushioning pads 142 which are spaced apart from each other. Accordingly, the heel of the user is sandwiched between the two heel cushioning pads 142 when the foot of the user is placed in position for massaging. Particularly, when the two heel cushioning pads 142 rhythmically inflate and deflate, the muscles of the ankle, which are clamped between the two heel cushioning pads 142, receive a massage and relaxation.

Figure 16:
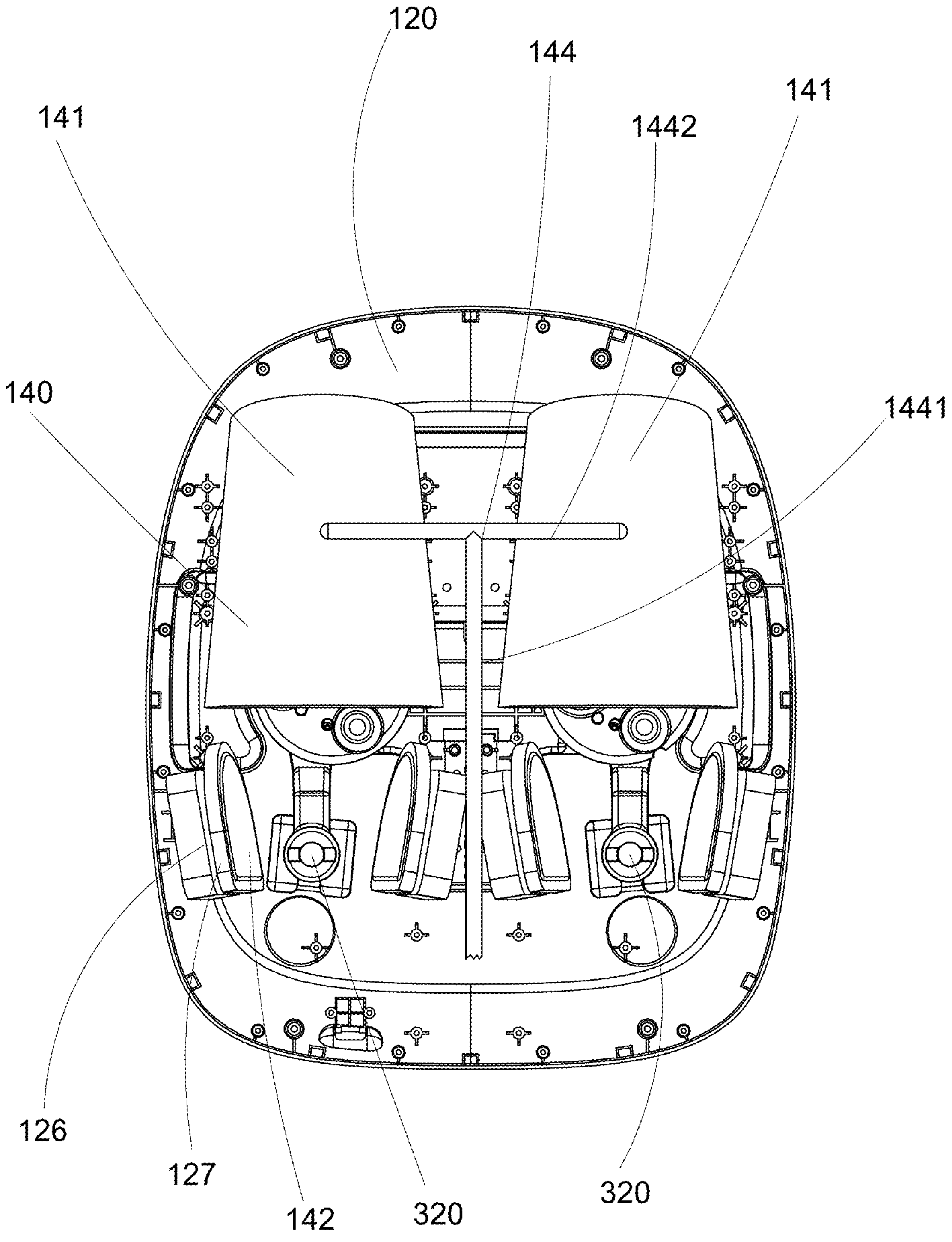
FIG. 16 is a schematic view illustrating the massage assembly in a lower shell of the foot massage arrangement according to the third embodiment of the present invention.

As shown in FIG. 16 of the drawings, the lower shell 120 further comprises two set of retention plates 126 extended from the bottom wall 121, each set of retention plates 126 comprises two retention plates 126 which are spaced from each other, and two heel cushioning pads 142 are provided between the two retention plates 126. An EVA (Ethylene Vinyl Acetate Copolymer) cushioning member 127 may further be provided between the retention plate 126 and the heel cushioning pad 142 to provide an additional cushioning effect.

According to this embodiment, the foot massage arrangement further comprises a heating assembly 500 which comprises two sets of heating elements 510 for warming the two feet of the user. Each set of heating elements 510 comprises a plurality of heating elements 510 which are mounted to the lower shell 120 and positioned under the corresponding sole massage head 310.

The lower shell 120 further comprises a mounting bracket 128 which is mounted to the bottom wall 121 for housing the motor 411 and the first and second transmission unit 330 and 340, each set of heating elements 510 is mounted on top of the mounting bracket 128, and each rotating plate 311 of the sole massage head 310 is provided with a plurality of heat conduction holes 314 which is respectively aligned with the plurality of heating elements 510, so that the heat generated by each heating element 510 is able to be transferred to the foot of the user through the corresponding heat conduction hole 314 in the rotating plate 311 for warming up the foot of the user.

The two sole massage heads 310 are provided above the mounting bracket 128, and the mounting bracket 128 comprises two penetrating holes 1281, the two driving arms 333 are respectively passing through the two penetrating holes 1281 and being mounted with the two rotating plates 311 of the two sole massage heads 310.

Alternatively, one or more of the massage heads of the present invention in other examples may be embodied as vibration massage head, suction massage head, or other suitable massage structure.

Figure 19:
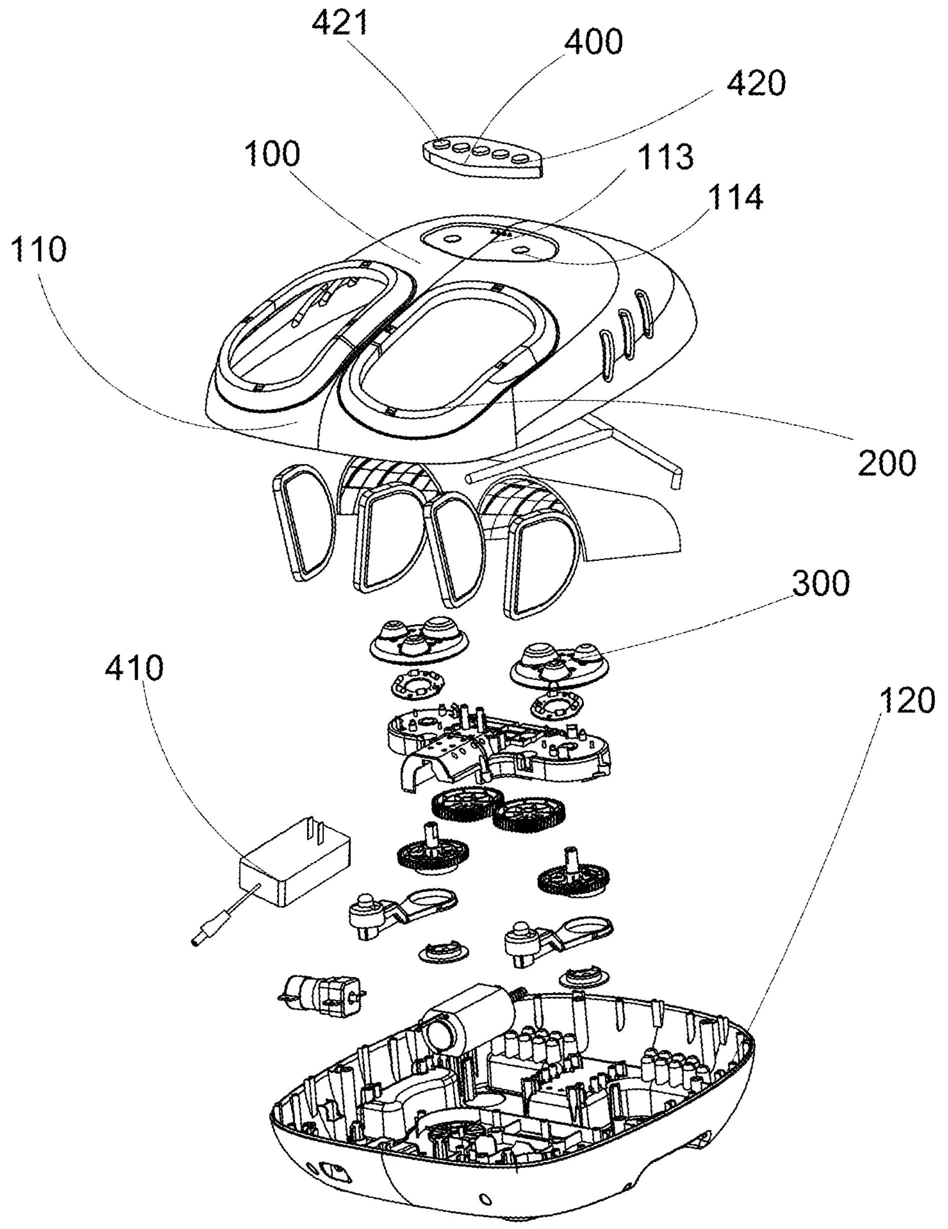
FIG. 19 is an exploded view of a foot massage arrangement according to a second alternative mode of the third embodiment of the present invention.

Referring to FIG. 19 of the drawings, a foot massage arrangement according to a second alternative mode of the above third embodiment of the present invention is illustrated. The foot massage arrangement comprises a shell body 100, a pocket assembly 200, a massage assembly 300, and a control assembly 400. The control assembly 400 comprises a power source 410 which is arranged to drive the operation of the massage assembly 300 and a controller 420 detachably mounted to the upper shell 110 of the shell body 100 for controlling the operation of the massage assembly 300.

According to this embodiment, the controller 420 can be a remote controller that is is held on a hand of the user for controlling the operation of the massage assembly 300. A groove 113 can be formed in the upper shell 110 for receiving the controller 420. Like, the second embodiment, a silicon body can be disposed in the groove 113 for retaining the remote controller 420 in position.

In this embodiment, the upper shell 110 may comprise one or more magnetically attracting members 114 to allow a bottom of the remote controller 420 to be magnetically attracted to the upper shell 110. Accordingly, the bottom of the remote controller 420 is provided with magnetically attracting points that is able to be magnetically attracting with the corresponding magnetically attracting members 114 on the upper shell 110.

Alternatively, the remote controller 420 may be further configured in a manner that when the controller 420 is coupled with the magnetically attracting members 114, the controller 420 is further electrically connected to the power module 413, so that the controller 420 is charged by the power module 413 and can be used when it is fixed in the groove 113 of the upper shell 110.

Figure 20:
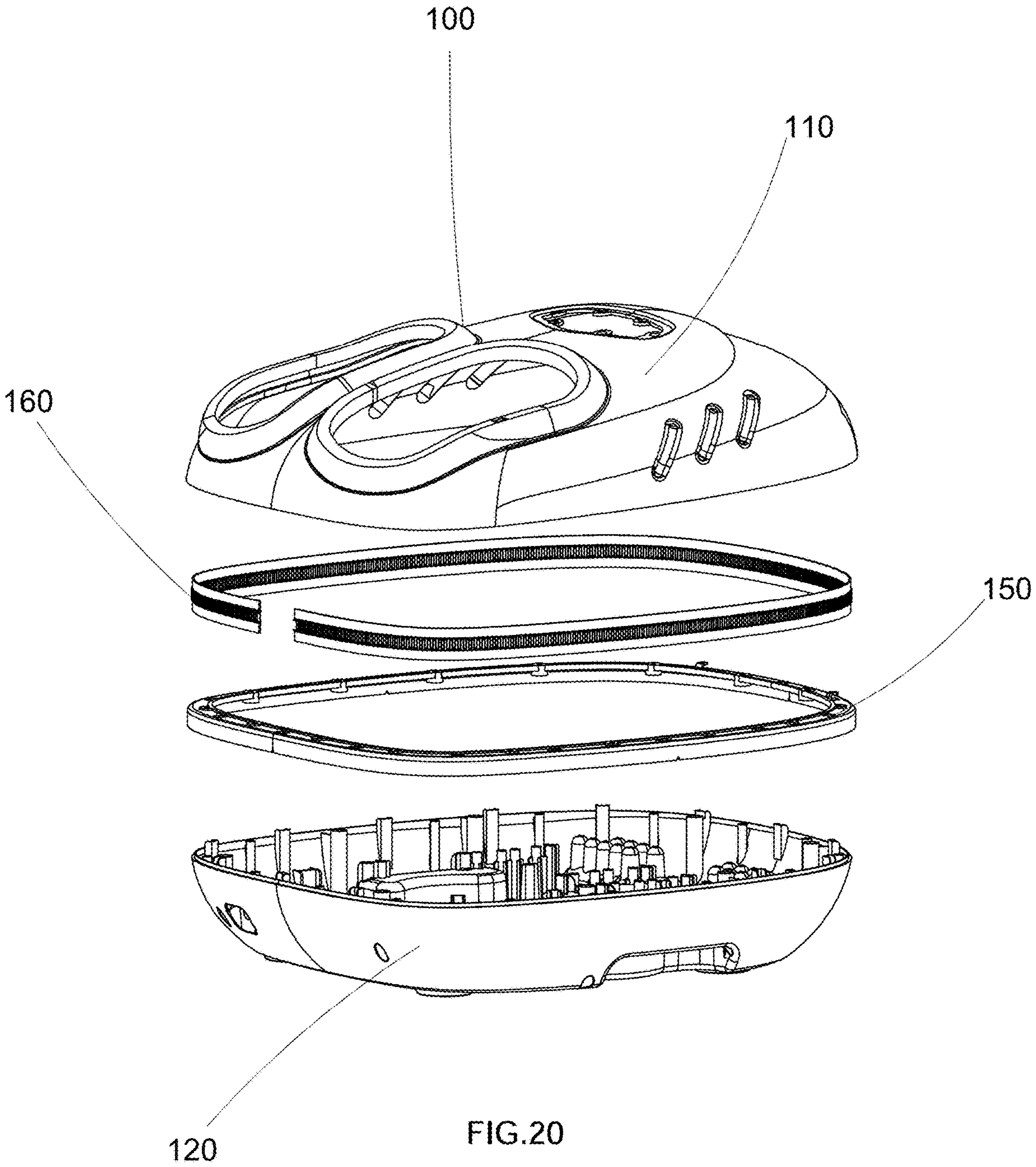
FIG. 20 is an exploded view of a shell body of a foot massage arrangement according to a third alternative mode of the third embodiment of the present invention.
Figure 21:
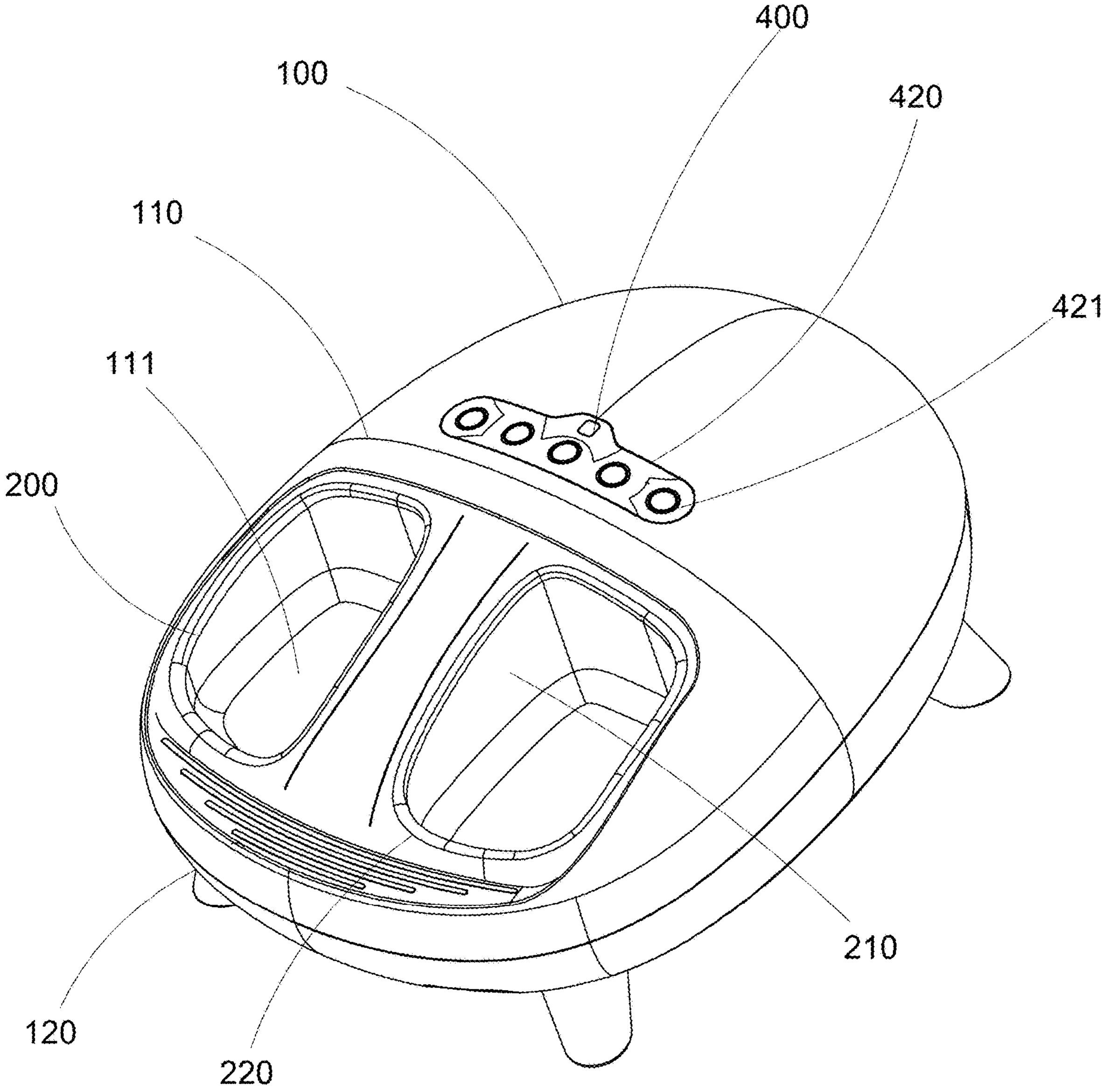
FIG. 21 is a perspective view of a foot massage arrangement according to a fourth embodiment of the present invention.

Referring to FIG. 20 of the drawings, a foot massage arrangement according to a third alternative mode of the above third embodiment of the present invention is illustrated. In this embodiment, the foot massage arrangement comprises a shell body 100 which comprises an upper shell 110 which is a flexible shell, a lower shell 120 which is a rigid shell, a flexible ring 150 and a zipper ring 160. The flexible upper shell 110, the flexible ring 150 and the zipper ring 160 are stitched together to form an integral flexible assembly that can be mounted to the lower shell 120. The zipper ring 160 can be shifted into an open state, so that the upper shell 110 is in an open state that allow the easy installation and maintenance of the foot massage arrangement.

Referring to FIGS. 21 to 34 of the drawings, a foot massage arrangement according to a fourth embodiment of the present invention is illustrated, the foot massage arrangement comprises a shell body 100, a pocket assembly 200, a massage assembly 300, and a control assembly 400. The massage assembly 300, the pocket assembly 200 and the control assembly 400 are assembled on the shell body 100. The massage assembly 300 is arranged to provide a massage effect to the foot of the user, the pocket assembly 200 is mounted on the shell body 100 for receiving at least one foot of the user, the control assembly 400 comprises a power source 410 which is arranged to drive the operation of the massage assembly 300 and a controller 420 for controlling the operation of the massage assembly 300.

More specifically, the shell body 100 comprises an upper shell 110 and a lower shell 120 which is assembled to the upper shell 110 to define a receiving cavity 130 for receiving the massage assembly 300.

According to this embodiment, the pocket assembly 200 comprises at least one foot receiving pocket 210 for receiving a foot of the user and at least one fixing pocket 220 which is fixed to the shell body 100. The foot receiving pocket 210 can be disposed in the fixing pocket 220 for holding the foot of the user and can be detachable from the fixing pocket 220 for easy replacement and clean.

More specifically, the upper shell 110 has two openings 111 which are communicated to the receiving cavity 130 of the shell body 100, the pocket assembly 200 comprises two foot receiving pockets 210 and two fixing pockets 220, the two foot receiving pockets 210 are respectively disposed into the two fixing pockets 220 through the two openings 111. Accordingly, the two feet of the user can be respectively disposed into the two foot receiving pockets 210 through the two openings 111.

With reference to FIG. 11, each of the two foot receiving pockets 210 in this embodiment also can be detachably mounted to the corresponding fixing pocket 220. As an example, the pocket assembly 200 comprises at least one connecting element 230 which is embodied as a zipper member 231 for detachably mounting the foot receiving pocket 210 with the corresponding fixing pocket 220.

Each of the two fixing pocket 220 is connected to one of the upper shell 110 and the lower shell 120. According to this embodiment, each of the two fixing pocket 220 is connected to the lower shell 120 and the upper shell 110. More specifically, the lower shell 120 comprises a bottom wall 121 and a surrounding wall 122 extended from a peripheral edge of the bottom wall 121. Each of the two fixing pockets 220 includes a distal end portion which is connected to the surrounding wall 122 of the lower shell 120 and an approximate end portion which is connected to the upper shell 110 adjacent to the two openings 111. In other words, the two openings 111 may be formed at a font side portion of the upper shell 110, the distal end portion of each fixing pocket 220 is connected to the lower shell 120 at a rear side portion of the lower shell 120, so that each fixing pocket 220 is substantially extended in a length direction of the foot massage arrangement for guiding the foot of the user to be naturally placed on the massage assembly 300.

The foot receiving pockets 210 and the fixing pockets 220 can be made of a same flexible material, and the zipper member 231 can be arranged to detachably mount the foot receiving pocket 210 to the corresponding fixing pocket 220. More specifically, each of the foot receiving pockets 210 comprises a pocket body 211 for receiving the foot of the user, the pocket body 211 includes a closed end 212 and an open end 213 which is provided with an opening edge 214 for defining an access opening 215 of the pocket body, the opening edge 215 of the foot receiving pocket 210 can be mounted to an edge 222 of the fixing pocket 220 which comprises a fixing pocket body 221 for receiving the corresponding foot receiving pocket 210.

Figure 22:
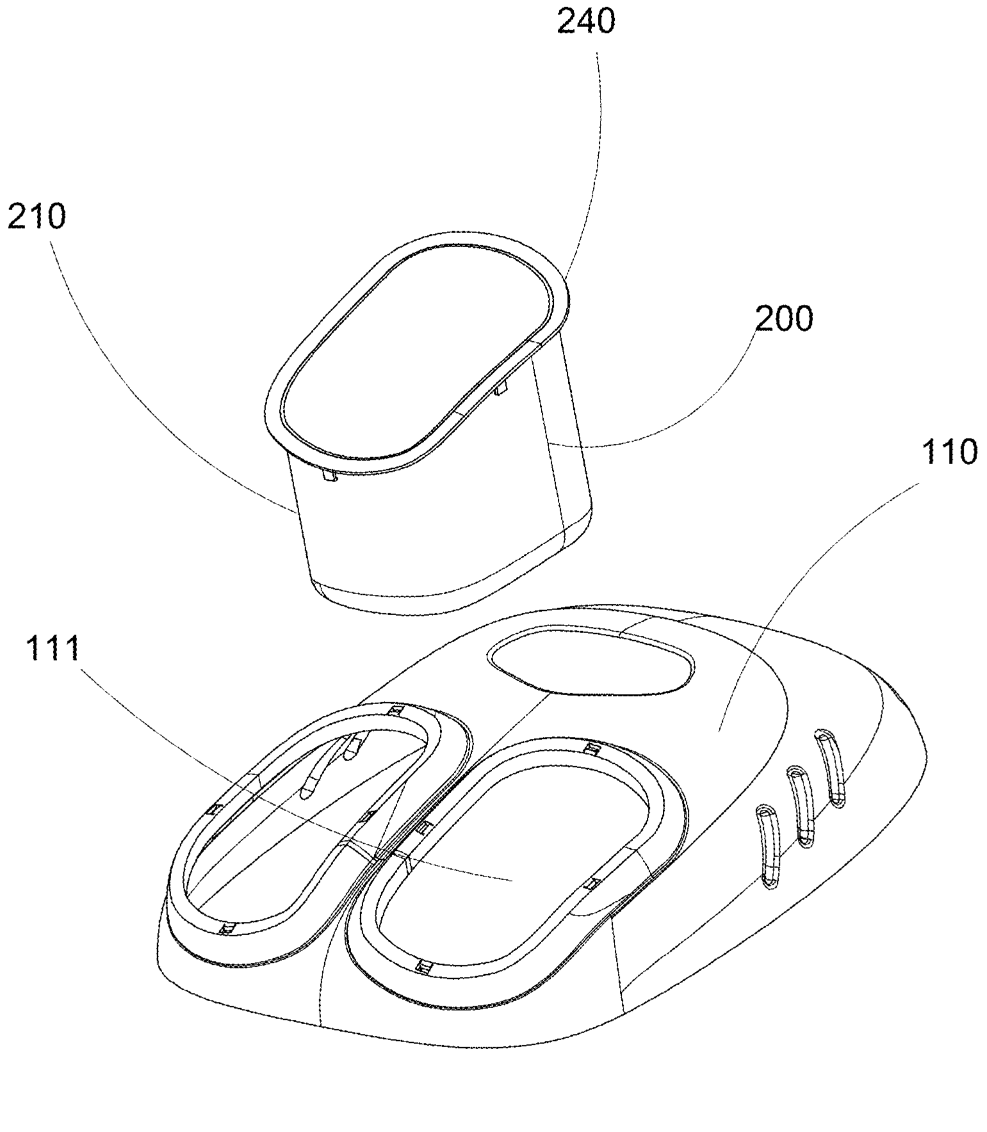
FIG. 22 is a perspective view illustrating a first alternative pocket assembly of the foot massage arrangement according to the fourth embodiment of the present invention.

As shown in FIG. 22 of the drawings, as an alternative mode of this embodiment, the pocket assembly 200 comprises two mounting frames 240, the two foot receiving pockets 210 are respectively mounted on the two mounting frames 240. The two mounting frames 240 are respectively detachably mounted to the top of the upper shell 110, so as to detachably mount the mounting pocket assembly 200 to the upper shell 110.

The detachable connecting manner between each mounting frame 240 and the upper shell 110 can be any suitable manner, such as by magnetic connection, snap-fit connection, hook and loop fasteners, threaded fasteners, and clamps.

Figure 23:
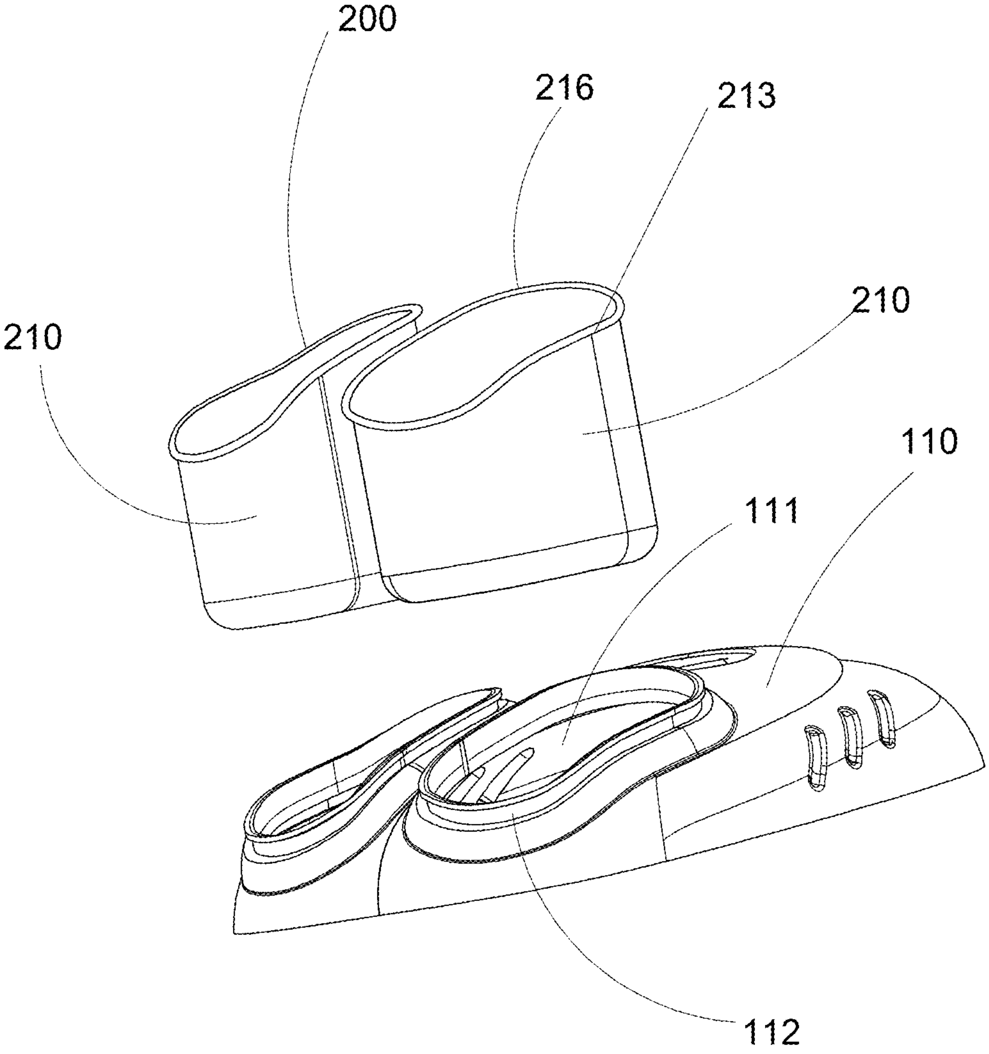
FIG. 23 is a perspective view illustrating a second alternative pocket assembly of the foot massage arrangement according to the fourth embodiment of the present invention.

As shown in FIG. 23 of the drawings, as an alternative mode of this embodiment, the upper shell 110 has two retention grooves 112 around the two openings 111 respectively. Each foot receiving pocket 210 comprises a elastic band 216 which is sewn to the open end 213 thereof, so that when the elastic band 216 is stretched, it can be fitted into the corresponding retention groove 112 of the upper shell 110, so as to mount the corresponding foot receiving pocket 210 to the upper shell 110 and is easy to be detached for cleaning.

Similarly, the controller 420 for controlling the operation of the massage assembly 300 can be mounted on a top of the upper shell 110, and a control interface 421 of the controller 420 can be exposed for facilitating the user to operate. The control interface 421 may comprises pressing buttons or may be embodied as a touch screen.

The power source 410 of the control assembly 400 comprises a motor 411, an output shaft 412 and a power module 413 electrically coupled to the controller 420 and the motor 411. The power module 413 may comprise a rechargable battery that supplies an electric power to the controller 420 and the motor 411.

Figure 24:
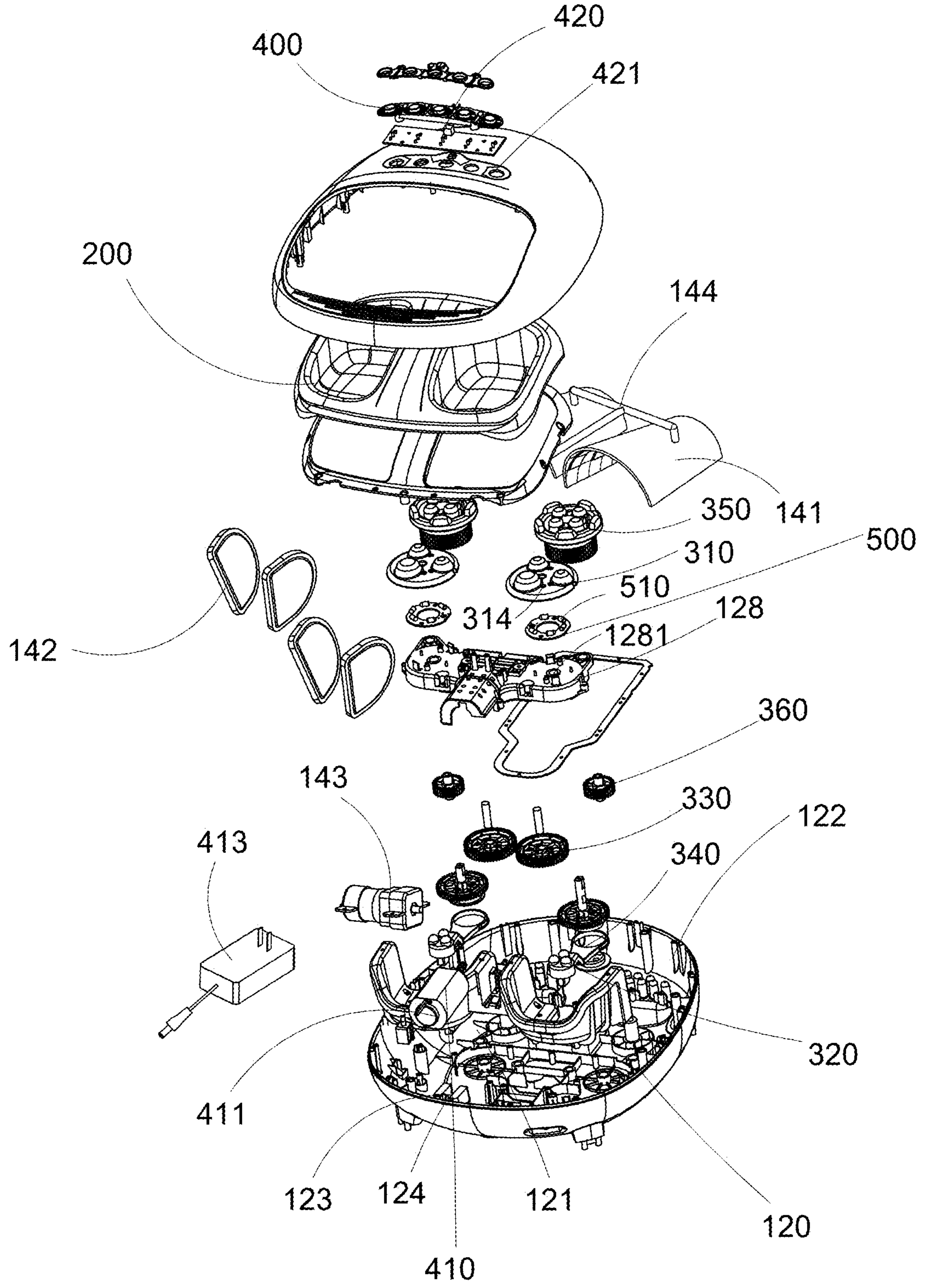
FIG. 24 is an exploded view of the foot massage arrangement according to the fourth embodiment of the present invention.
Figure 25:
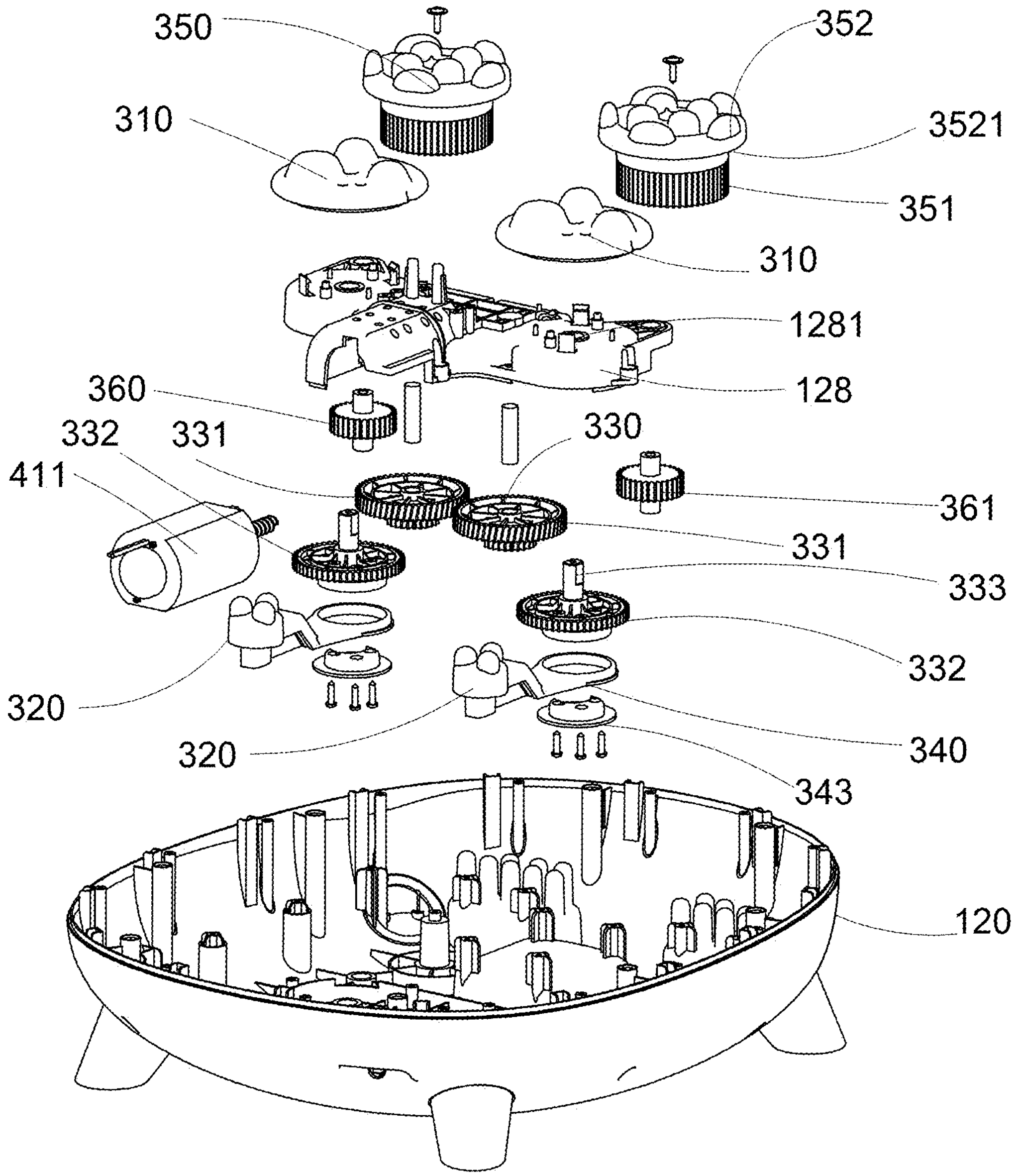
FIG. 25 is an exploded view illustrating a massage assembly of the foot massage arrangement according to the fourth embodiment of the present invention.
Figure 26:
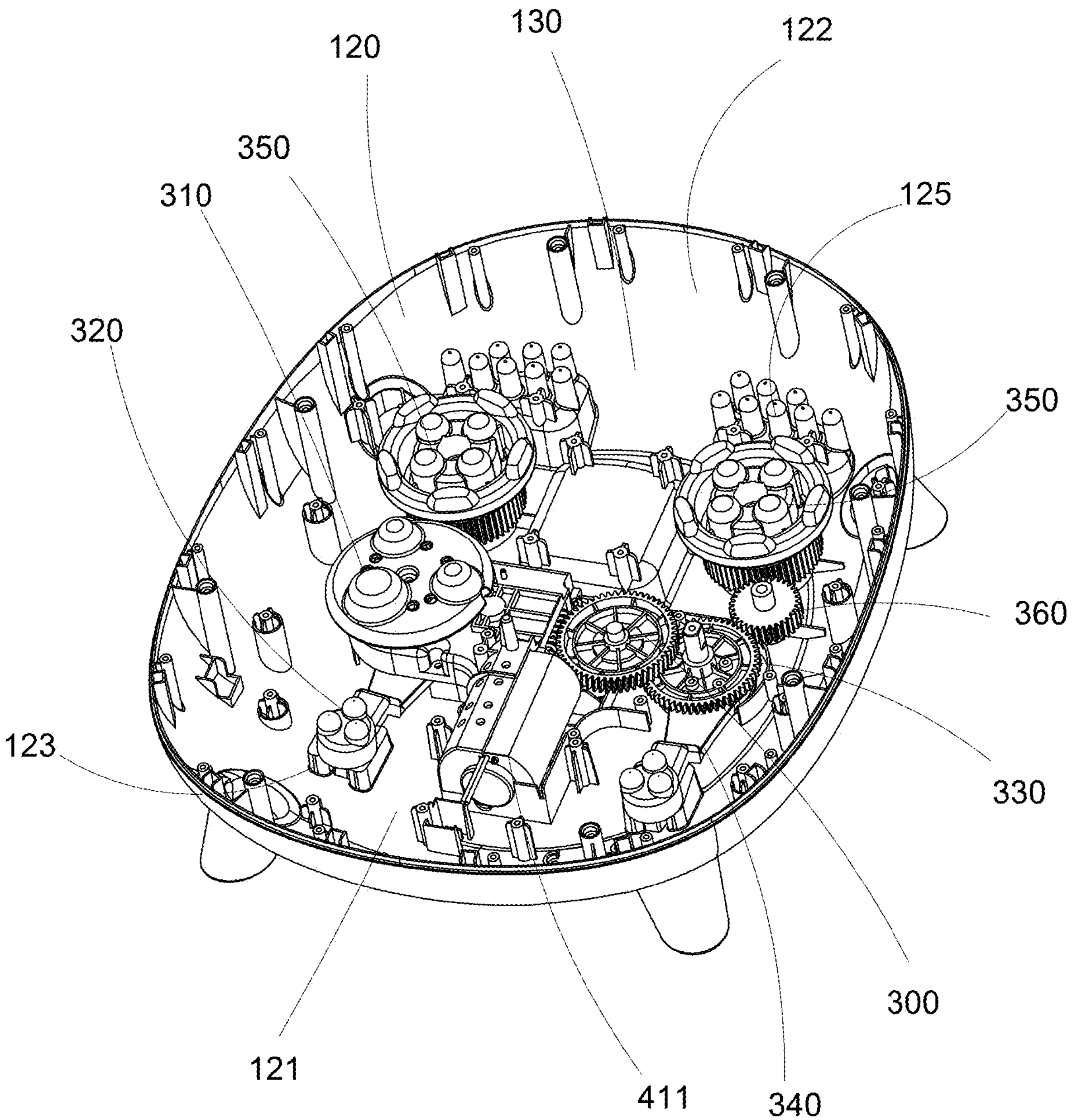
FIG. 26 is a schematic view illustrating the massage assembly in a lower shell of the foot massage arrangement according to the fourth embodiment of the present invention.

Referring to FIGS. 24 to 26, the massage assembly 300 comprises at least one sole massage head 310 for massaging a sole of the foot of the user, at least one heel massage head 320 for massaging a heel of the foot of the user, at least one first transmission unit 330 coupled to the power source 410 for driving the movement of the sole massage head 310, at least one second transmission unit 340 which is capable of being driven by the power source 410 to drive the movement of the heel massage head 320, at least one toe massage head 350 for massaging toes of the foot of the user, and at least one third transmission unit 360 to drive the movement of the toe massage head 350.

In this embodiment, the foot massage arrangement is arranged for massaging both of the two feet of the user, and thus the massage assembly 300 comprises two sole massage heads 310 for massaging the soles of the two feet of the user, two heel massage head 320 for massaging heels of the two feet of the user, two first transmission units 330 coupled to the power source 410 for driving the movement of the sole massage head 310, two second transmission units 340 which are capable of being driven by the power source 410 for driving the movement of the two heel massage heads 320, two toe massage heads 350 for massaging toes of the foot of the user, and two third transmission units 360 to drive the movement of the two toe massage heads 350.

Figure 27:
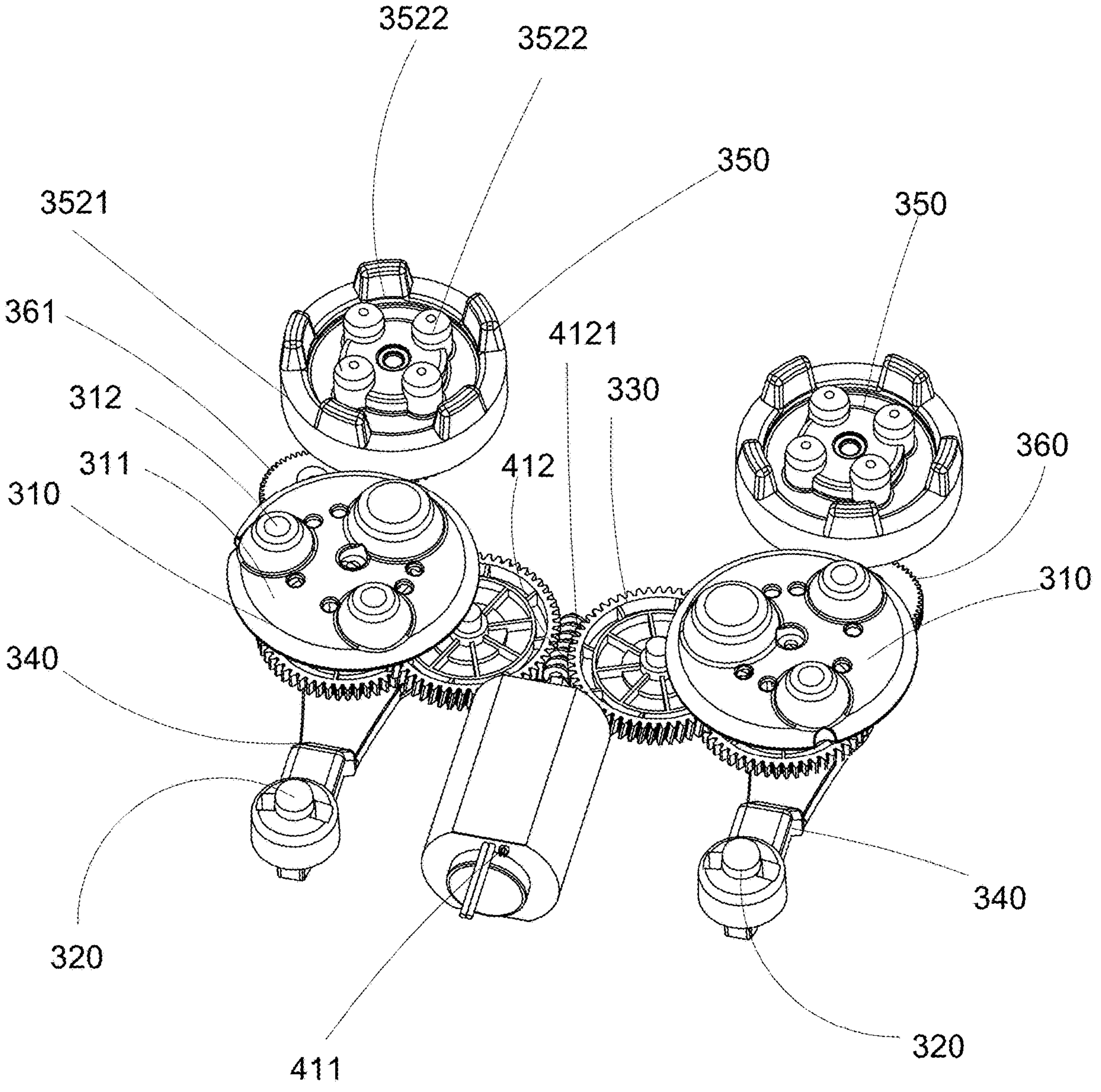
FIG. 27 is a perspective view illustrating the massage assembly of the foot massage arrangement according to the fourth embodiment of the present invention.
Figure 28:
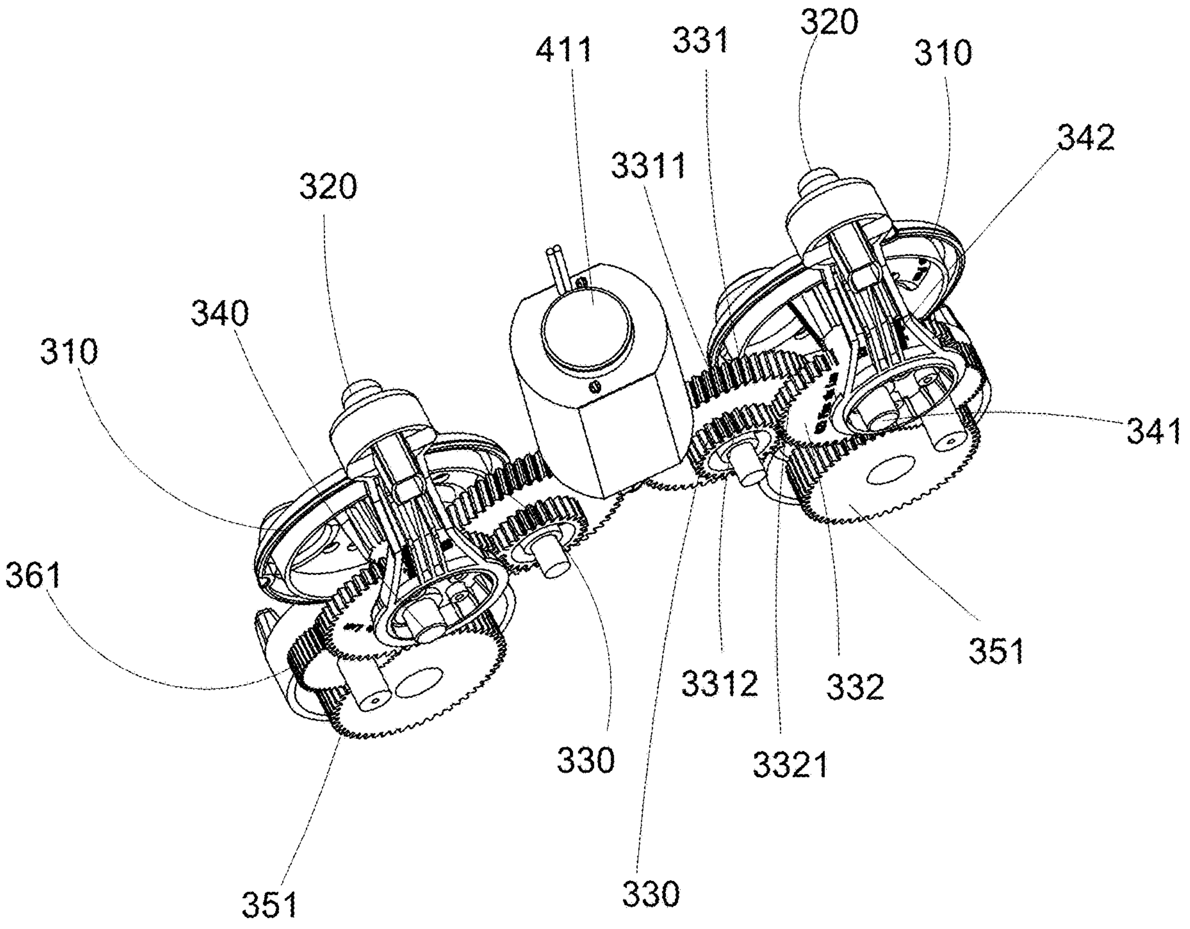
FIG. 28 is another perspective view illustrating the massage assembly of the foot massage arrangement according to the fourth embodiment of the present invention.
Figure 29:
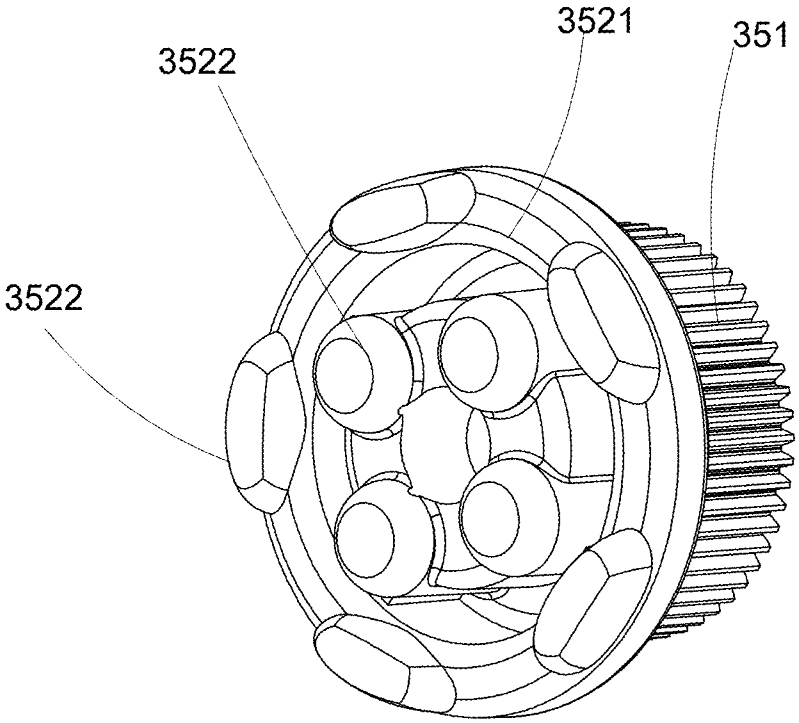
FIG. 29 is an enlarged perspective view illustrating a toe massage head of the foot massage arrangement according to the fourth embodiment of the present invention.
Figure 30:
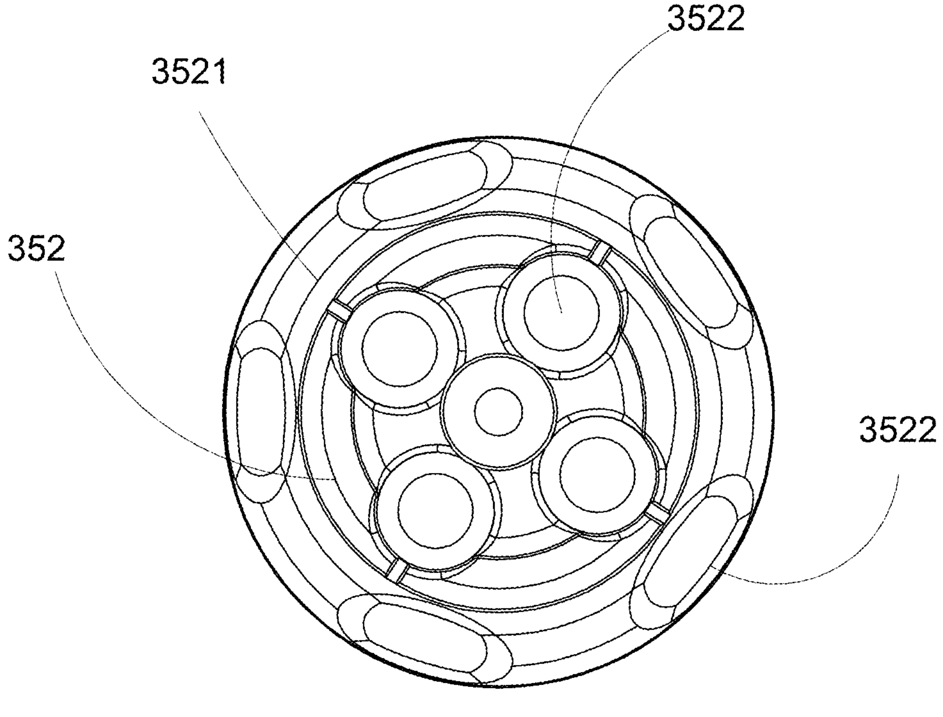
FIG. 30 is an enlarged schematic view illustrating the toe massage head of the foot massage arrangement according to the fourth embodiment of the present invention.

According to this embodiment, as shown in FIGS. 26 to 28, the massage assembly 300 is coupled to the motor 411 in a manner that the motor 411 is capable of driving the movement of all of the sole massage heads 310, the heel massage heads 320 and the toe massage heads 350. In addition, the sole massage heads 310 move simultaneously with the heel massage heads 320 and the toe massage heads 350, so that the soles, heels and toes of the two feet of the user can be simultaneously massaged.

More specifically, in this embodiment, the output shaft 412 of the power source 410 is a screw shaft which comprises engaging screws 4121, each first transmission units 330 comprises a first gear element 331 coupled to the output shaft 412 of the power source 410, a second gear element 332 coupled to the first gear element 331, and a driving arm 333 connected to the second gear element 332 for driving the rotation movement of the corresponding sole massage head 310.

Accordingly, the first gear element 331 comprises an upper teeth portion 3311 which is engaged with the engaging screws 4121 of the output shaft 412 of the power source 410, and a lower teeth portion 3312 which is engaged and meshed with engaging teeth 3321 of the second gear element 332, so that when the motor 411 is in operation, the output shaft 412 is rotating to drive the first gear element 331 to rotate, and thus the second gear element 332 is driven to rotate by the first gear element 331, and the driving arm 333 connected to a center of the second gear element 332 is driven to rotate, so as to drive the corresponding sole massage head 310 to rotate for massaging the sole of the foot of the user.

Figure 32:
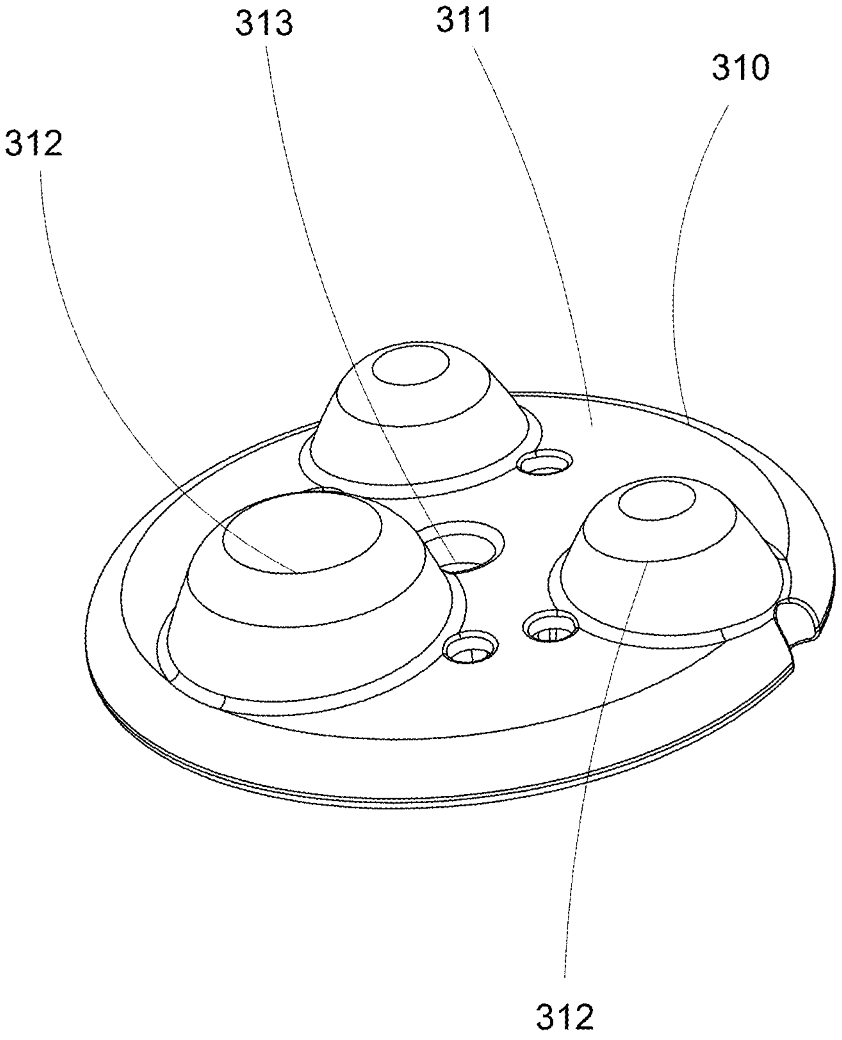
FIG. 32 is an enlarged perspective view illustrating a sole massage head of the foot massage arrangement according to the fourth embodiment of the present invention.
Figure 33:
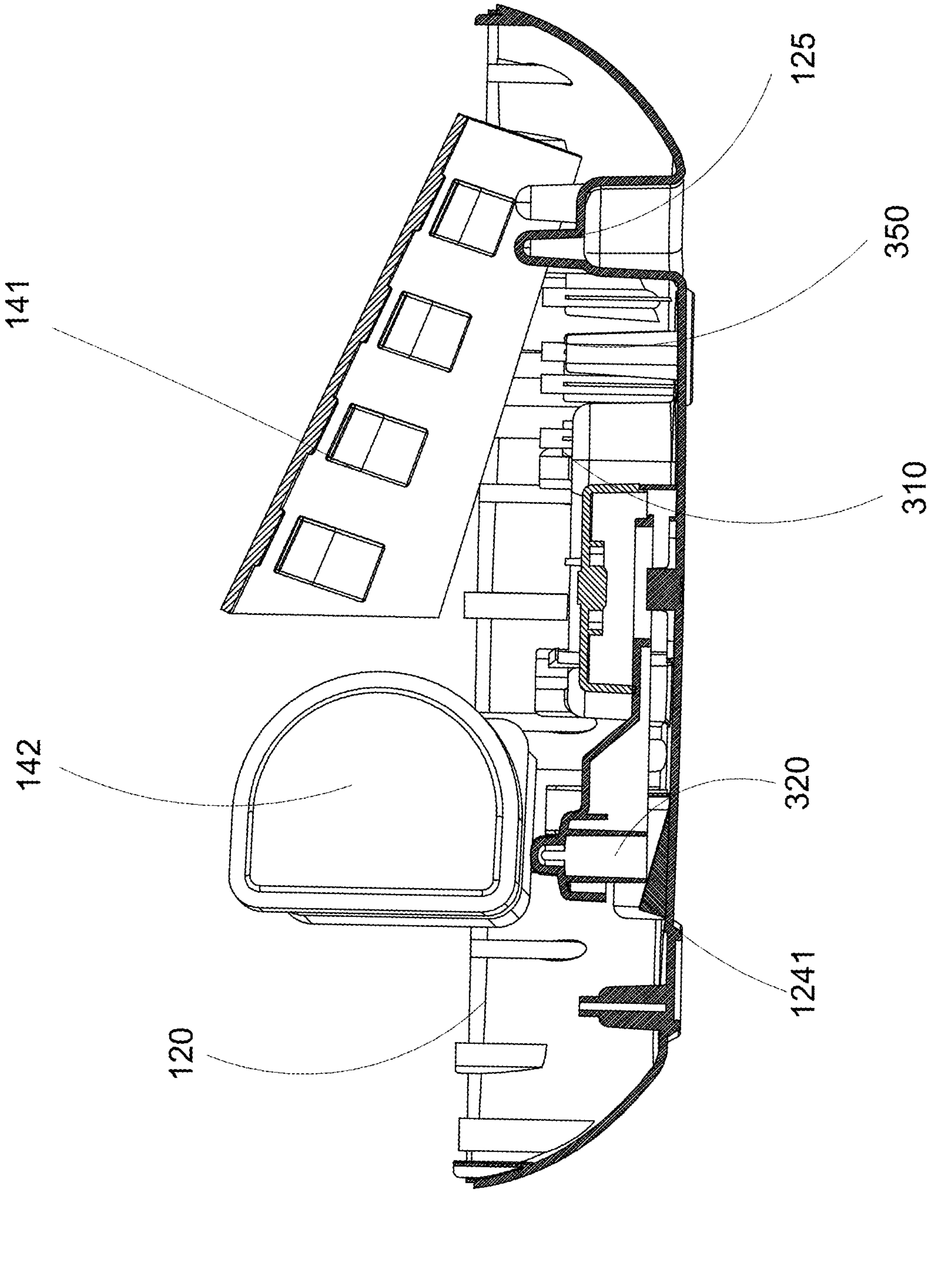
FIG. 33 is a sectional view illustrating the massage assembly in the lower shell of the foot massage arrangement according to the fourth embodiment of the present invention.

Each sole massage head 310 comprises a rotating plate 311 and a plurality of sole massage protrusions 312 integrally extended from the rotating plate 311 for extending into tissues of the sole of the foot of the user during the massage operation. The rotating plate 311 has a central hole 313 for mounting the driving arm 333, as shown in FIG. 32. Accordingly, the driving arm 333 is penetrating through the central hole 313 of the rotating plate 311, so that when the driving arm 333 is driven to rotate by the second gear element 332, the rotating plate 311 will corresponding be drive to rotate, so that the massage protrusions 312 are driven to rotate for massaging the sole of the foot of the user.

As shown in FIG. 32 of the drawings, each sole massage head 310 comprise three sole massage protrusions 312 which are evenly distributed on the rotating plate 311 for evenly massage the sole of the foot of the user. The three sole massage protrusions 312 ensure that pressure is evenly applied across the entire sole, and this balanced distribution can effectively alleviate tension and stress in the foot muscles.

Each second transmission unit 340 is coupled to the second gear element 332 to drive the corresponding heel massage head 320 to move to massage the heel of the foot of the user. According to this embodiment, each heel massage head 320 is driven to be reciprocating to massage the heel of the foot of the user. Accordingly, each heel massage head 320 is moving back and forth during the operation, and the movement of each heel massage head 320 is a linear movement.

Figure 31:
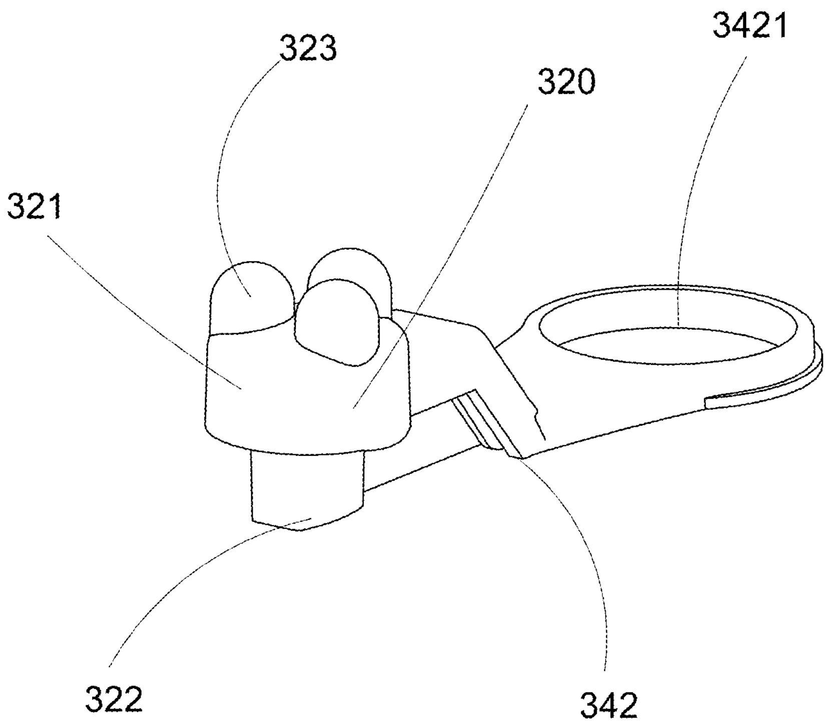
FIG. 31 is an enlarged perspective view illustrating a heel massage head of the foot massage arrangement according to the fourth embodiment of the present invention.

More specifically, as shown in FIG. 27, FIG. 28 and FIG. 31, each second transmission unit 340 comprises an eccentric pin 341 extended from a bottom of the second gear element 332, an extension arm 342 having a retention hole 3421 at a first end portion thereof, and a fixing cover 343 mounting the first end portion of the extension arm 342 to the second gear element 332. A second end portion of the fixing arm 342 is connected to the corresponding heel massage head 320.

The lower shell 120 comprises two set of guide ridges 123 which are protruded from the bottom wall 121, and a guide groove 124 is defined between each set of two guide ridges 123 for guiding the movement of the corresponding heel massage head 320. In other words, when each heel massage head 320 is driven to move by the second transmission unit 340, the linear movement of the corresponding heel massage head 320 is limited and guided in the corresponding guide groove 124.

Each heel massage head 320 comprise an upper end portion 321 which is extended out of the guide groove 124 for massaging the heel of the user, and an lower portion 322 which is sliding in the corresponding guide groove 124 for guiding the linear movement of each heel massage head 320. In this embodiment, each heel massage head 320 further comprises a plurality of heel massage protrusions 323 integrally protruded on a top of the upper end portion 321 for extending into tissues of the heel of the user to massage the heel of the user.

According to this embodiment, as shown in FIG. 25 and FIGS. 28 to 30, each toe massage head 350 comprises a lower mesh portion 351 and an upper toe massage portion 352 integrally extended from the lower mesh portion 351, the upper toe massage portion 352 comprises a rotation base 3521 and a plurality of toe massage protrusions 3522 integrally protruded from the rotation base 3521 for massaging toes of the user.

In this embodiment, the plurality of toe massage protrusions 3522 are distributed into two circles, with the spacing between two protrusions on the outer circle being larger. The larger spacing between protrusions on the outer circle allows for more targeted and less concentrated pressure, catering to the different massage needs of various toe regions. In other words, toes vary in shape and size, with the big toe being larger and the other toes tapering in size. The two circles of massage protrusions, with different spacing, can adapt to these variations, providing effective coverage for all toes.

The toes have different surface areas can benefit from varied spacing between the massage protrusions. The outer circle with larger spacing can target larger toe areas, while the inner circle with closer spacing can focus on smaller, more delicate areas.

The design of the toe massage protrusions, with varied spacing, conforms to the natural shape and varying widths of toes, ensuring a more comfortable and ergonomic fit. This conformity enhances the user experience by providing a massage that adapts to individual toe shapes. By distributing the pressure evenly and ensuring that each toe receives adequate attention, the design minimizes discomfort and maximizes user comfort during the massage session Accordingly, toes have multiple joints, tendons, and small muscles that can benefit from the multidirectional stimulation provided by rotating massaging protrusions. The rotational movement of the corresponding toe massage head 350 can reach and effectively massage these intricate structures. toes contain numerous acupressure points that can be effectively stimulated by rotating protrusions, promoting overall health and well-being, and rotating massaging protrusions can provide a 360-degree massage, ensuring that all areas of the toes, including the sides and undersides, are thoroughly massaged.

Each third transmission unit 360 comprises a third gear element 361 which is meshed and engaged with the second gear element 332, and the lower mesh portion 351 of the corresponding toe massage head 350 is meshed and engaged with the third gear element 361, so that the corresponding toe massage head 350 can be driven to rotate by the motor 411, the corresponding first transmission unit 330 and the corresponding third transmission unit 360.

Simultaneously massaging the heel, sole, and toes of the foot by the sole massage head 310, the heel massage head 320 and the toe massage head 350 ensures that the entire foot is treated, providing a comprehensive massage that addresses all key areas. This holistic approach ensures that no part of the foot is neglected. By covering all areas, the massage promotes balanced relaxation and comfort throughout the entire foot, enhancing the overall effectiveness of the treatment.

In this embodiment, particularly, the toe massage heads 350 are introduced to massage toes of the user. Toes, like other parts of the foot, require good blood flow to maintain health. Massaging the toes by the toe massage heads 350 can enhance circulation, helping to deliver oxygen and nutrients to these smaller extremities. When toes are massaged along with the heel and sole, it promotes overall foot blood circulation, which is beneficial for reducing swelling and inflammation.

In addition, the linear movement of each heel massage head 320, the rotation movement of each sole massage head 310, and the rotation movement of each toe massage head 350 is driven by the same motor 411, so that the massages heads are simultaneously driven to move., and thus simultaneously massaging the heel, sole, and toes ensures that the entire foot is treated, providing thorough and balanced care, and the massage promotes uniform relaxation and comfort throughout the entire foot.

The lower shell 120 further comprises two sets of protrusion pins 125 which are respectively protruded from the bottom wall 121 for massaging the toes of the user, particularly the toe heads of the user. Each of the two sets of protrusion pins 125, which is provided adjacent to the corresponding toe massage head 350, comprises a plurality of protrusion pins 125 and two adjacent protrusion pins 125 are spaced apart from each other.

The shell body 100 further comprises an air cushioning assembly 140 which comprises two air cushioning covers 141 for providing an air cushioning effect to the soles of the two feet of the user respectively, two sets of heel cushioning pads 142 for providing an air cushioning effect to the heels of the two feet of the user respectively, and an air pump 143 for pumping air into the air cushioning cover 141 and the heel cushioning pads 142.

Figure 34:
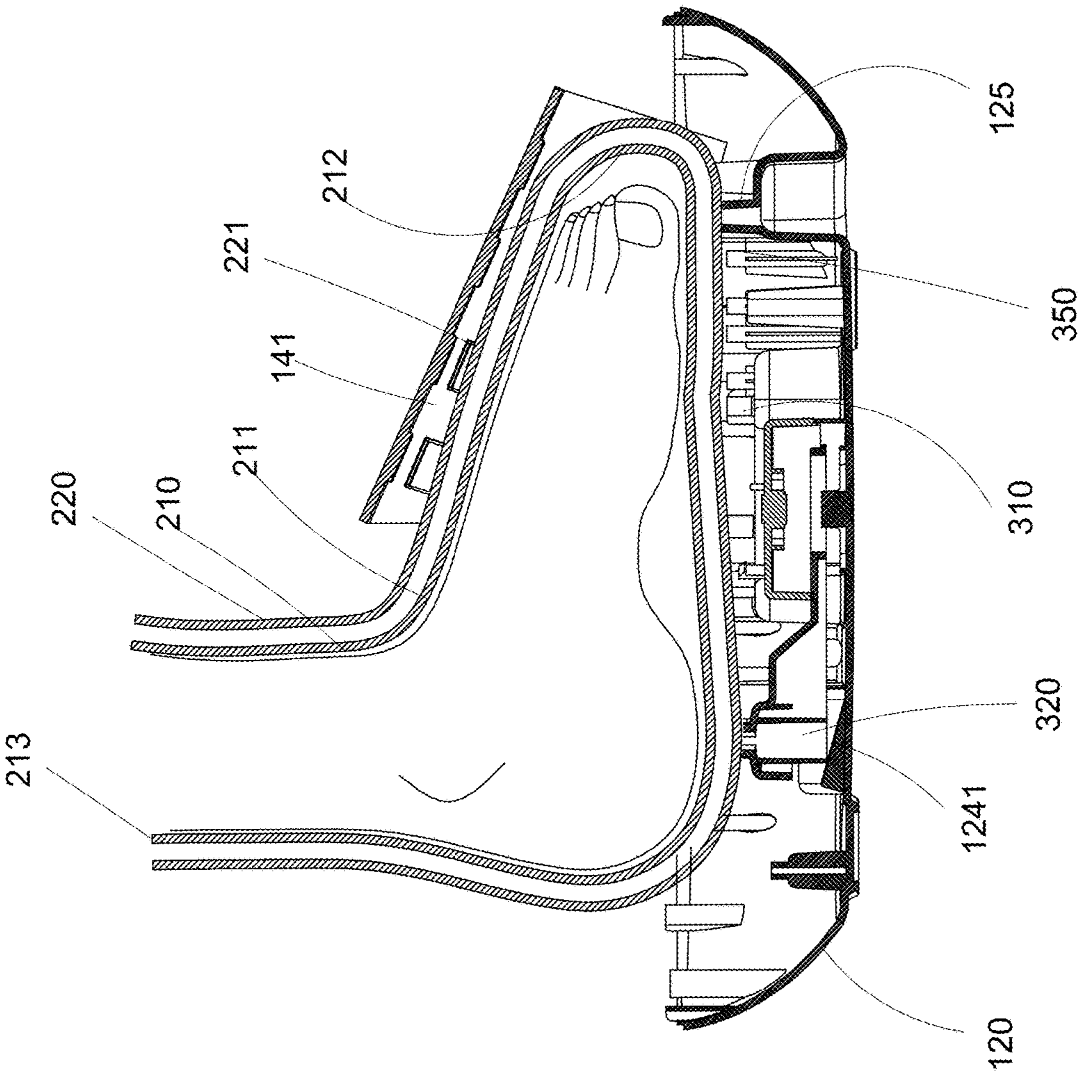
FIG. 34 is a sectional view illustrating the foot massage arrangement in a use state according to the fourth embodiment of the present invention.

In this embodiment, as shown in FIG. 34 of the drawings, each foot receiving pocket 210 is disposed into the fixing pocket 220 and the arrangement of the pockets are partially covered under the air cushioning cover 141, when the air cushioning cover 141 is inflated by the air pump 143, the sloe of the foot of the user is air cushioned by the air cushioning cover 141 above it.

In this embodiment, the air cushioning cover 141 is further extended to a position above the toes of the user. Accordingly, when the air cushioning cover 141 is inflated, the toes of the user are sandwiched between the corresponding set of protrusion pins 125 and the inflated air cushioning cover 141, so as to enhance the massage effect to the toes of the user, particularly to toe heads of the user.

The air cushioning assembly 140 further comprises an air filling pipe unit 144 which comprises a guide pipe 1441, and a plurality of feeding pipes 1442 communicated to the guide pipe 1441 for feeding the air into the corresponding air cushioning covers 141 and the heel air cushioning covers 142.

Each set of heel cushioning pads 142 comprises two heel cushioning pads 142 which are spaced apart from each other. Accordingly, the heel of the user is sandwiched between the two heel cushioning pads 142 when the foot of the user is placed in position for massaging.

According to this embodiment, the foot massage arrangement further comprises a heating assembly 500 which comprises two sets of heating elements 510 for warming the two feet of the user. Each set of heating elements 510 comprises a plurality of heating elements 510 which are mounted to the lower shell 120 and positioned under the corresponding sole massage head 310.

The lower shell 120 further comprises a mounting bracket 128 which is mounted to the bottom wall 121 for housing the motor 411 and the first and second transmission unit 330 and 340, each set of heating elements 510 is mounted on top of the mounting bracket 128, and each rotating plate 311 of the sole massage head 310 is provided with a plurality of heat conduction holes 314 which is respectively aligned with the plurality of heating elements 510, so that the heat generated by each heating element 510 is able to be transferred to the foot of the user through the corresponding heat conduction hole 314 in the rotating plate 311 for warming up the foot of the user.

The above description is only the disclosure of the preferred embodiment of the present invention, and the implementation and scope of the present invention should not be limited thereto. Those skilled in the art should be able to realize that any equivalent substitution and obvious modification made based on the disclosure and illustrations of the present invention are within the scope of the present invention.

What is claimed is:

1. A foot massage arrangement for massaging two feet of a user, comprising:

a shell body having a receiving cavity and two openings communicated to said receiving cavity configured to allow the two feet of the user to enter said receiving cavity, wherein said shell body comprises an upper shell and a lower shell connected to said upper shell to define said receiving cavity, wherein said lower shell comprises a bottom wall and two sets of guide ridges which are protruded from said bottom wall, wherein a guide groove is defined between two guide ridges of each of said two sets of guide ridges;

a massage assembly which comprises two sole massage heads, two heel massage heads, two first transmission units coupled to said two sole massage head respectively, and two second transmission units coupled to said two heel massage heads respectively; and a control assembly which comprises a controller and a power source electrically connected to said controller for driving said two first transmission units and said two second transmission units, so as to respectively drive said two sole massage heads to massage two soles of the user and drive said two heel massage heads to massage two heels of the user;

wherein said power source comprises a motor and an output shaft extended from said motor, wherein each said first transmission unit comprises a first gear element engaged with said output shaft, a second gear element engaged with said first gear element, and a driving arm extended from a center of said second gear element at a top of said second gear element for driving said corresponding sole massage head, wherein each said second transmission unit comprises an eccentric pin connected to a bottom of said second gear element and deviated from said center of said second gear element, and an extension arm coupled to said eccentric pin to drive said corresponding heel massage head;

wherein each said heel massage head comprises an upper end portion which is extended out of said guide groove for massaging the heel of the user, and a lower portion which is arranged for sliding in said guide groove;

wherein when said motor is in operation, each said first transmission unit and each said second transmission unit are simultaneously driven by said motor such that that said driving arm is rotated to drive said corresponding sole massage head to rotate and said eccentric pin is rotated to drive said corresponding heel massage head by said extension arm to allow said lower portion of said corresponding heel massage head to slide along said guide groove in a linear reciprocating motion.

2. The foot massage arrangement according to claim 1, wherein said output shaft comprises engaging screws, said first gear element comprise an upper teeth portion meshed with said engaging screws of said output shaft and a lower teeth portion meshed with said second gear element.

3. The foot massage arrangement according to claim 1, wherein said massage assembly further comprises two toe massage heads for massaging toes of the two feet of the user respectively and two third transmission units coupled to said two toe massage heads for being driven by said power source to drive said two toe massage heads respectively.

4. The foot massage arrangement according to claim 1, wherein said massage assembly further comprises two toe massage heads for massaging toes of the two feet of the user respectively and two third transmission units coupled to said two toe massage heads for being driven by said power source to drive rotation of said two toe massage heads respectively, wherein said motor drives movement of each said sole massage head, each said heel massage head and each said toe massage head simultaneously.

5. The foot massage arrangement according to claim 4, wherein each said third transmission unit comprises a third gear element which is engaged with said second gear element, wherein each said toe massage head comprises an upper toe massage portion and a lower mesh portion connected to said upper toe massage portion, wherein said lower mesh portion of each said toe massage head is engaged with said corresponding third gear element.

6. The foot massage arrangement according to claim 5, wherein said output shaft comprises engaging screws, said first gear element comprise an upper teeth portion meshed with said engaging screws of said output shaft and a lower teeth portion meshed with said second gear element.

7. The foot massage arrangement according to claim 5, wherein said upper toe massage portion of each said toe massage head comprises a rotation base and two circles of toe massage protrusions distributed on said rotation base.

8. The foot massage arrangement according to claim 4, further comprising a heating assembly which comprises a plurality of heating elements provided under said corresponding sole massage head, wherein each said sole massage head comprises a rotating plate and a plurality of massage protrusions protruded from said rotating plate, wherein said rotating plate has a plurality of heat conduction holes aligned with said plurality of heating elements respectively.

9. The foot massage arrangement according to claim 4, further comprising an air cushioning cover provided above each said sole massage head, and a plurality of protrusion pins mounted in said shell body under said air cushioning cover, wherein said air cushioning cover is capable of being deflated to press the toes of the user against said plurality of protrusion pins, wherein said two air cushion covers are respectively configured to be arch-shaped to conform to the two feet of the user, wherein said plurality of protrusion pins are protruded from and fixed to said bottom wall of said lower shell, wherein the foot massage arrangement further comprises two sets of heel cushioning pads each comprising two heel cushioning pads which are spaced apart from each other for sandwiching the heel of the user.

10. The foot massage arrangement according to claim 4, wherein a bottom floor is provided at a bottom of said corresponding guide groove, wherein said bottom floor is an inclined surface extended from said bottom wall of said lower shell, wherein when each said heel massage head is sliding along said corresponding guide groove, said lower portion of each said heel massage head is sliding on said bottom floor, so as to adjust a height of said upper end portion of said corresponding heel massage head.

11. The foot massage arrangement according to claim 4, further comprising a pocket assembly which comprises two foot receiving pockets detachably coupled to said two openings respectively, wherein said two foot receiving pockets are capable of being disposed into said receiving cavity for receiving the two feet of the user, wherein said two foot receiving pockets are detachably mounted to said shell body.

12. The foot massage arrangement according to claim 11, wherein said pocket assembly comprises two fixing pockets which are fixed to said shell body and extended into said receiving cavity, wherein said two foot receiving pockets are respectively disposed into said two fixing pockets and detachably coupled to said two fixing pockets, wherein the foot massage arrangement further comprises an air cushioning cover which is covered on each corresponding said fixing pocket which is embedded with said corresponding foot receiving pocket, wherein each said foot receiving pockets comprises a pocket body having a closed end and an open end which is provided with an opening edge for defining an access opening of said pocket body, wherein each said fixing pocket, which is a permanent part fixed to said shell body, comprises a fixing pocket body having a distal end portion which is connected to said lower shell and an approximate end portion which is connected to said upper shell adjacent to said corresponding opening, wherein said opening edge of said foot receiving pocket is detachably mounted to an edge of said corresponding fixing pocket adjacent to said approximate end portion of said corresponding fixing pocket, wherein each said foot receiving pocket and each said fixing pocket are flexible pockets.

13. The foot massage arrangement according to claim 1, further comprising a heating assembly which comprises a plurality of heating elements provided under said corresponding sole massage head, wherein each said sole massage head comprises a rotating plate and a plurality of massage protrusions protruded from said rotating plate, wherein said rotating plate has a plurality of heat conduction holes aligned with said plurality of heating elements respectively.

14. The foot massage arrangement according to claim 1, further comprising an air cushioning cover provided above each said sole massage head, and a plurality of protrusion pins mounted in said shell body under said air cushioning cover, wherein said air cushioning cover is capable of being deflated, so as to press the toes of the user against said plurality of protrusion pins, wherein said two air cushion covers are respectively configured to be arch-shaped to conform to the two feet of the user, wherein said plurality of protrusion pins are protruded from and fixed to said bottom wall of said lower shell.

15. The foot massage arrangement according to claim 1, wherein said controller is detachably mounted to said shell body.

16. The foot massage arrangement according to claim 1, wherein said shell body comprises an upper shell which is a flexible shell, a lower shell which is a rigid shell, a flexible ring and a zipper ring, wherein said flexible upper shell, said flexible ring and said zipper ring are stitched together to form an integral flexible assembly that is mounted to said lower shell, wherein said zipper ring is capable of being shifted into an open state to allow said upper shell to be in an open state that allows installation and maintenance of said foot massage arrangement.

* * * * *